United States Patent
Murias et al.

(10) Patent No.: US 9,119,019 B2
(45) Date of Patent: Aug. 25, 2015

(54) WIRELESS MESH NETWORK AND METHOD FOR REMOTE SEISMIC RECORDING

(75) Inventors: Ronald Gerald Murias, Calgary (CA); Rashed Haydar, Calgary (CA)

(73) Assignee: SRD Innovations Inc., Calgary (CA)

( * ) Notice: Subject to any disclaimer, the term of this patent is extended or adjusted under 35 U.S.C. 154(b) by 153 days.

(21) Appl. No.: 13/546,982

(22) Filed: Jul. 11, 2012

(65) Prior Publication Data

US 2013/0016625 A1 Jan. 17, 2013

Related U.S. Application Data

(60) Provisional application No. 61/570,025, filed on Dec. 13, 2011, provisional application No. 61/506,516, filed on Jul. 11, 2011.

(51) Int. Cl.

| | |
|---|---|
| *H04L 12/28* | (2006.01) |
| *H04W 8/00* | (2009.01) |
| *H04W 4/00* | (2009.01) |
| *G01V 1/24* | (2006.01) |
| *H04Q 9/00* | (2006.01) |
| *H04W 84/22* | (2009.01) |
| *G01V 1/22* | (2006.01) |
| *H04L 29/08* | (2006.01) |

(52) U.S. Cl.
CPC ............ *H04W 8/005* (2013.01); *G01V 1/247* (2013.01); *H04Q 9/00* (2013.01); *H04W 4/006* (2013.01); *G01V 1/223* (2013.01); *H04L 67/12* (2013.01); *H04Q 2209/25* (2013.01); *H04Q 2209/40* (2013.01); *H04W 84/22* (2013.01)

(58) Field of Classification Search
CPC ............. H04L 67/12; H04Q 2209/40; H04Q 2209/25; H04W 8/005; H04W 84/22; H04W 4/006; G01V 1/223; G01V 1/247
USPC .......... 370/235, 252, 254, 255, 328, 338, 400
See application file for complete search history.

(56) References Cited

U.S. PATENT DOCUMENTS

| | | | |
|---|---|---|---|
| 6,041,283 | A | 3/2000 | Sigmar |
| 6,219,620 | B1 | 4/2001 | Park |
| 6,424,931 | B1 | 7/2002 | Sigmar |
| 7,224,642 | B1 | 5/2007 | Tran |
| 2001/0018845 | A1* | 9/2001 | Roberts ............................ 73/40 |

(Continued)

FOREIGN PATENT DOCUMENTS

WO 2009/129601 A1 10/2009

*Primary Examiner* — Ajay Cattungal
(74) *Attorney, Agent, or Firm* — Christensen O'Connor Johnson Kindness PLLC

(57) ABSTRACT

A method of collecting data from wireless sensor units arranged in a mesh network is disclosed, each wireless sensor unit having one or more sensors arranged on or below the ground surface for remote seismic recording, the method comprising: clustering the wireless sensor units into two or more sub mesh clusters, each sub mesh cluster having an aggregator assigned to the sub mesh cluster; acquiring data with the wireless sensor units by sensing one or more physical parameters; within each sub mesh cluster, each of the wireless sensor units transmitting the acquired data directly or indirectly to the respective aggregator; each aggregator aggregating at least a portion of the acquired data received from the wireless sensor units within the respective sub mesh cluster into aggregated data; and each aggregator transmitting the aggregated data to a base node. A wireless mesh network for remote seismic recording is also disclosed.

17 Claims, 12 Drawing Sheets

(56) References Cited

U.S. PATENT DOCUMENTS

| | | | |
|---|---|---|---|
| 2003/0151513 A1* | 8/2003 | Herrmann et al. | 340/573.1 |
| 2005/0282558 A1* | 12/2005 | Choi et al. | 455/456.1 |
| 2006/0242457 A1* | 10/2006 | Roy et al. | 714/12 |
| 2007/0025365 A1* | 2/2007 | Sagot et al. | 370/400 |
| 2007/0036031 A1* | 2/2007 | Barakat et al. | 367/76 |
| 2009/0024328 A1* | 1/2009 | Ferber et al. | 702/14 |
| 2009/0092112 A1* | 4/2009 | Kim et al. | 370/338 |
| 2009/0129321 A1* | 5/2009 | Jain | 370/328 |
| 2010/0058085 A1* | 3/2010 | Chien et al. | 713/320 |
| 2010/0074133 A1* | 3/2010 | Kim et al. | 370/252 |
| 2010/0075707 A1* | 3/2010 | Fritsch et al. | 455/517 |
| 2010/0090823 A1* | 4/2010 | Park et al. | 340/539.1 |
| 2011/0130162 A1* | 6/2011 | Park et al. | 455/507 |
| 2012/0014289 A1* | 1/2012 | Ortega et al. | 370/255 |
| 2012/0290266 A1* | 11/2012 | Jain et al. | 702/187 |
| 2012/0300632 A1* | 11/2012 | Li et al. | 370/235 |

\* cited by examiner a) L1 at line-end,
single Link Node b) L1 mid-line,
two Link Nodes

- A-F: 2.2 Mbps
- B-F: 2.5 Mbps
- C-F: 3.1 Mbps
- D-F: 4.7 Mbps
- E-F: 11.2 Mbps
- F-X: 11.2 Mbps

WIRELESS MESH NETWORK AND METHOD FOR REMOTE SEISMIC RECORDING

CROSS-REFERENCE TO RELATED APPLICATIONS

This application claims the benefit under 35 U.S.C. §119(e) of U.S. Provisional Applications No. 61/570,025 filed Dec. 13, 2011 and No. 61/506,516 filed Jul. 11, 2011.

TECHNICAL FIELD

This document relates to wireless mesh networks and methods for remote seismic recording.

BACKGROUND

Seismic surveys are extensively used in the oil and gas industry to understand the subsurface and to provide structural images of the geological formation within the earth using reflected sound waves. The results of the survey are used to identify reservoir size, shape and depth as well as porosity and the existence of fluids. Geophysicists and geologists use this information to pinpoint the most likely locations for successfully drilling for oil and natural gas.

A seismic survey may be conducted by placing a large number of geophones in the area of interest. The geophones may be set up in lines or in grids. Using shakers, rams, or small explosives, the ground is shaken and the geophones acquire the reflected sound data from the different sub-layers in the ground. Another method, the so-called "micro seismic" survey, uses passive measurement of natural or secondary disturbances to create a picture of the sub-surface structure. A huge amount of data is collected in a given seismic survey which may cover 40 sq km and take days to gather.

The amount of data which is retrieved during a seismic survey is quite large. In an exemplary case a geophone measures three axes at a sampling rate of 4 bytes per millisecond (each byte is 8 bits giving a resolution of 24 bits which is the accuracy required by the seismic survey). In this case, the data rate per geophone is 4 bytes/msec×8 bits/byte×3=96 kbps (Kilobits per second).

If the survey is using 1000 geophones, the data rate is then 96 Mbps (Mega bits per second). Because wireless systems have overhead and error correction to operate reliably, even the highest data rate broadband wireless systems can't accommodate this data rate in traditional configurations such as point to multipoint or pure mesh systems.

Several patent documents are known that use wireless links in a seismic network, including U.S. Pat. Nos. 6,424,931; 6,041,283; 6,219,620; and 7,224,642, and PCT Patent Publication No. WO 2009129601. However, there is room for improvement in the manner in which data is collected and delivered for processing.

SUMMARY

A method of collecting data from wireless sensor units arranged in a mesh network is disclosed, each wireless sensor unit having one or more sensors arranged on or below the ground surface for remote seismic recording, the method comprising: clustering the wireless sensor units into two or more sub mesh clusters, each sub mesh cluster having an aggregator assigned to the sub mesh cluster; acquiring data with the wireless sensor units by sensing one or more physical parameters; within each sub mesh cluster, each of the wireless sensor units transmitting the acquired data directly or indirectly to the respective aggregator; each aggregator aggregating at least a portion of the acquired data received from the wireless sensor units within the respective sub mesh cluster into aggregated data; and each aggregator transmitting the aggregated data to a base node.

A wireless mesh network for remote seismic recording is also disclosed, the wireless mesh network comprising: a plurality of wireless sensor units arranged into two or more sub mesh clusters within a mesh network, each wireless sensor unit having one or more sensors arranged on or below a ground surface for acquiring data by sensing one or more physical parameters, each wireless sensor unit having a wireless transceiver for transmitting acquired data; two or more aggregators, each aggregator positioned within a respective sub mesh cluster and wirelessly connected to communicate directly or indirectly with the wireless transceivers of each wireless sensor unit of the respective sub mesh cluster for receiving and aggregating the acquired data from the wireless sensor units; and a base node wirelessly connected to communicate with the two or more aggregators for receiving aggregated data from each aggregator.

In various embodiments, there may be included any one or more of the following features: Clustering further comprises the base node transmitting a discovery command to each aggregator; each aggregator acquiring by local discovery a list of wireless sensor units within a predetermined range from each aggregator; each aggregator transmitting the list to the base node; the base node clustering the wireless sensors into the two or more sub mesh clusters and assigning a respective aggregator to each sub mesh cluster based on the acquired lists; and the base node transmitting to each aggregator an assignment of the wireless sensor units contained in the sub mesh cluster assigned to the aggregator. Clustering further comprises: the base node transmitting a discovery command to each aggregator; each aggregator acquiring by discovery a list of wireless sensor units within a predetermined range from each aggregator; and each aggregator determining a respective sub mesh cluster for the aggregator. The predetermined range is one or more of a maximum number of hops, a maximum cluster size, a maximum distance from each aggregator, or minimum node signal quality. For each sub mesh cluster, the respective assigned aggregator is positioned within the sub mesh cluster. The position of each aggregator is selected to one or more of minimize the combined number of hops from the wireless sensor units in the respective sub mesh cluster, maximize the signal quality of the wireless sensor units in the respective sub mesh cluster to the aggregator, or maximize the signal quality of the aggregator to the base node. The wireless sensor units transmit the acquired data to the respective aggregator in response to an aggregator transmit command from the respective aggregator. Some or all of the aggregated data is transmitted by an aggregator in response to one or more transmit commands transmitted from the base node. The one or more transmit commands contain a schedule of one or more unique transmit time slots for each aggregator to transmit the respective aggregated data without interfering in the transmissions of other aggregators. Each unique transmit time slot is selected based on one or more of the size of the respective sub mesh cluster, or throughput requirements of the respective aggregator. Aggregating further comprises each aggregator processing the acquired data to produce processed acquired data of reduced transmission bandwidth requirements than the acquired data, in which the processed acquired data is then aggregated to produce the aggregated data. Each aggregator transmits the aggregated data to the base node by real-time streaming in packets.

Processing further comprises determining a representative data set to transmit to the base node as the aggregated data. The representative data set further comprises one or more of the acquired data from one or more wireless sensor units within the respective sub mesh cluster, an average data set of the acquired data of the wireless sensor units within the respective sub mesh cluster, and a median data set of the acquired data of the wireless sensor units within the respective sub mesh cluster. Processing further comprises producing from the acquired data from each wireless sensor unit respective data sets of offset values relative to the representative data set to transmit to the base node as part of the aggregated data. Each aggregator compares the acquired data between wireless sensor units; and each aggregator alerts the base node if the acquired data from one or more of wireless sensor units differs by more than a predetermined range from the acquired data sets of other wireless sensor units. Each aggregator status polls the wireless sensor units within the respective sub mesh cluster and generating a status report; and each aggregator transmits the status report to the base node. The base node transmits a channel change command to an aggregator; and the aggregator transmits a signal to each of the wireless sensor units within the respective sub mesh cluster to change channels. Each of the wireless sensor units transmits the acquired data further comprises transmitting the acquired data without timestamps; and adding one or more timestamps to the acquired data at the aggregator level or base node level. The acquired data is transmitted with one or more time offsets relative to a reference timestamp to allow calculation of the one or more timestamps at the aggregator level or base level. The acquired data is transmitted at one or more scheduled times to allow calculation of the one or more timestamps at the aggregator level or base level. Each sub mesh cluster further comprises one or more relay mesh nodes. Each aggregator is located at a central location within the respective sub mesh cluster.

In other embodiments, each sub mesh cluster has an on channel state and an off channel state, and one or more link nodes of each sub mesh cluster being configured in the off channel state to buffer data destined for an aggregator. Respective aggregators may be configured to buffer data destined for the associated sub mesh cluster when the associated sub mesh cluster is in the off channel state.

In another embodiment, there is provided a wireless sensor unit for use as a link node in a wireless sensor network, the wireless sensor unit comprising one or more sensors suitable for arrangement on or below a ground surface for acquiring data by sensing one or more physical parameters, each wireless sensor unit having a wireless transceiver for transmitting acquired data to an aggregator; and the wireless sensor unit having an on channel state and an off channel state and being configured in the off channel state to buffer data destined for the aggregator.

The disclosed methods and systems include novel ways to leverage the advantages of aggregators in a seismic mesh network. Autonomous node discovery and sub-mesh clustering allows the operator to discover and configure the entire mesh in a parallel manner, resulting in a more robust and faster mesh discovery process. In some embodiments the disclosure focuses on aggregation solutions specific to larger scale mesh systems deployed in varying terrain.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

Figure 1:
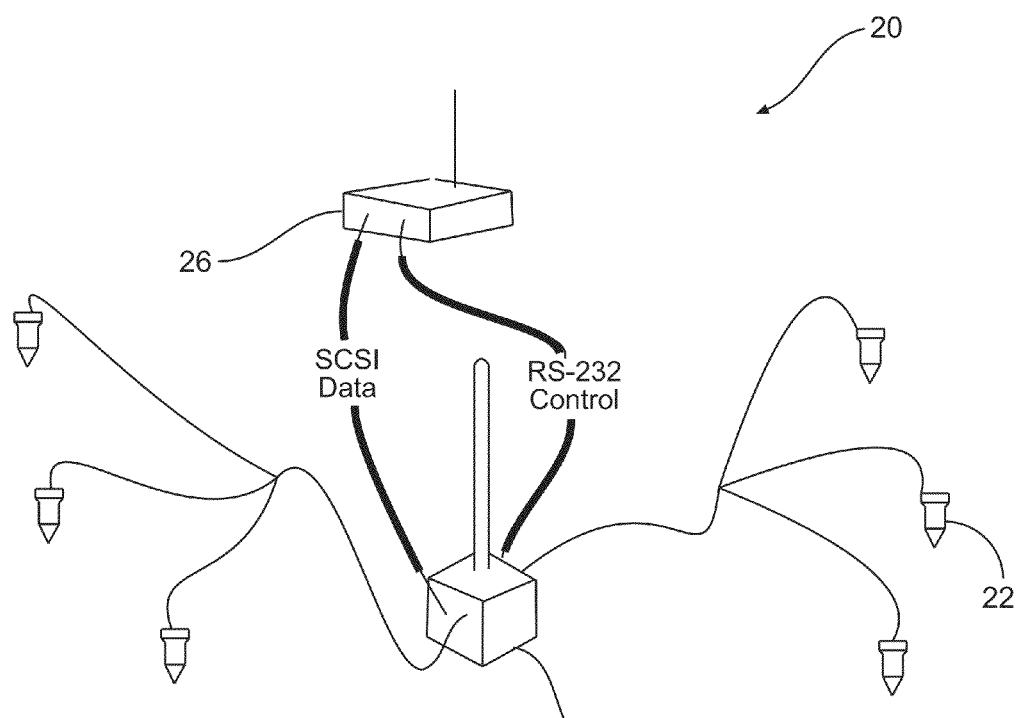
FIG. 1 shows an exemplary wireless sensor unit which includes a wireless capable data collection box connected to several sensors, in this case, geophones.

FIG. 1 illustrates a wireless sensor unit 20. Many different wireless sensor configurations may be used. In the example shown, wireless sensor unit 20 comprises several sensors 22, in this case six, connected by wires to a data collection box 24. The data collection box 24 is wired to a wireless transceiver 26. In some embodiments, instead of six sensors, there may be one or more sensors. In some embodiments, the wired connections shown in FIG. 1 may be wireless. In some embodiments, any combination of the sensors 22, data collection box 24 and wireless transceiver 26 may be incorporated in a single housing. In some embodiments, the sensors 22 may be geophones.

In FIG. 1, the data collection box 24 is connected to six digital geophones 22 capable of sampling data from three directions –X, Y, and Z. There are 3 geophones 22 connected in series and attached to each side of the box 24 via a cable. Each geophone 22 may for example sample the signal at 1 millisecond (ms) interval, and each sample consists of 4 bytes of data per millisecond. The wireless transceiver 26 may be connected to the data collection box 24 via RS-232 and SCSI ports. These connections may be generalized to other types of ports including (but not limited to) USB, FireWire, parallel, synchronous serial, etc.

Since there are 3 directions of motion sampled simultaneously, the data acquisition rate per geophone is 4 bytes/msec×8 bits/byte×3=96 kbps (Kilobits per second). With 6 geophones 22 attached per box 24, the data rate received by a box is therefore 576 kbps.

In a seismic network, the acquisition may occur over a period ranging from a minimum of 5 seconds to a maximum of 20 seconds, each acquisition followed by an 8 second interval. Therefore the data rate to be transmitted back to the central control unit will have a minimum data transmission rate of $$\frac{576 \text{ kbps} \times 5 \text{ sec}}{5 + 8 \text{ sec}} = 222 \text{ kbps}$$

And a maximum of $$\frac{576 \text{ kbps} \times 20 \text{ sec}}{20 + 8 \text{ sec}} = 412 \text{ kbps}$$

Therefore the maximum data rate for real time data transmission is 412 kbps per box 24. Given that there are sometimes hundreds of boxes 24 active at the same time, the amount of data flowing simultaneously through the network at the time of acquisition is quite substantial and requires careful management of the data flow throughout the network. Embodiments disclosed here are intended to provide real-time transmission of the data if required. Real-time in this case being defined as data transmission occurs substantially during the seismic data acquisition period. The network may offer the user the ability to tailor the performance to their specific requirements and their specific application. In some cases, they may not need to meet the real time requirement and the system enables the user to utilize it in a non-real time way.

A hybrid wireless mesh/cellular network configuration may be used with standards-based equipment. Equipment based on the standards may be configured to operate at different frequencies, thus allowing for extremely high data rates while avoiding problems of self-interference or limited bandwidth. However, any type of radio may be used which has the capability to transmit the amount of data required and is capable of being connected in mesh or cellular networks. As an example of a custom radio with such capabilities, Wi-LAN's VIP 110-24 is capable of forming a mesh network as required by this invention even though it is not based on a standard product.

In an embodiment, a Hybrid Mesh network system uses wireless units based on IEEE 802.11g standard capable of transmitting 36 Mbps (we will use an effective bandwidth of 27 Mbps to account for overhead) of data to distances determined by the following Friis equation:

$$P_r = P_t G_t G_r (\lambda/4\pi R)^2, \text{ where:}$$

$P_r$ is the received power,
$P_t$ is the transmitted power,
$G_t$ is the transmitter gain,
$G_r$ is the receiver gain,
R is the distance between routers, and
λ is the signal wavelength.

Conventionally, wireless sensor units 20 are arranged in long chains terminating in a backhaul unit (not shown). With 20 dBi transmit power, 36 Mbps links up to 500 m away may be attained within the advertised required fade margin of a typical off-the-shelf router, or, 24 Mbps links may be attained up to 1,000 m with a fade margin within the advertised required fade margin of a typical off-the-shelf router. By using a mesh configuration, each box may be able to receive data from another box in its immediate vicinity and re-transmit it to a box further down the line until all the data from all the boxes reaches its final destination. Boxes that are downstream from others have to transmit their own data as well as the data received from the boxes located upstream from them. At the network level, this means the total transmit time is equal to approximately half the time available. As a result the total number of boxes that may be connected in a single line or in a mesh configuration could be limited to about 32 boxes. Thus for every 32 boxes a backhaul unit is used to get the data back to the central control unit, although in practice these chains may be limited to 25 boxes per backhaul due to certain system inefficiencies. A backhaul unit comprises a transmitter and a receiver with highly directional antennas. These and all other values and calculations referred to herein are clearly exemplary numbers.

Conventional mesh network architectures are used either to connect geophones directly to each other, or to relay boxes, which are in turn connected to a data collection van some distance away. In some cases, higher level mesh networks are overlaid upon these local mesh networks in a backhaul network based on a more cellular approach.

A hybrid mesh network configuration is very well suited for seismic surveys. In some conventional networks, the network self-configures into linear meshes by means of each unit discovering and connecting to its nearest neighbors. All of the mesh units may use omni-directional antennas (antennas which cover 360 degrees of azimuth). If deployed, the backhaul units may use directional antennas with relatively wide beamwidths, say, 90 degrees or 120 degrees, to increase antenna gain and reduce interference. This allows them to be pointed in generally the right direction but without requiring an enormous amount of setup.

Overview of the disclosed system.

Figures 2, 2A:
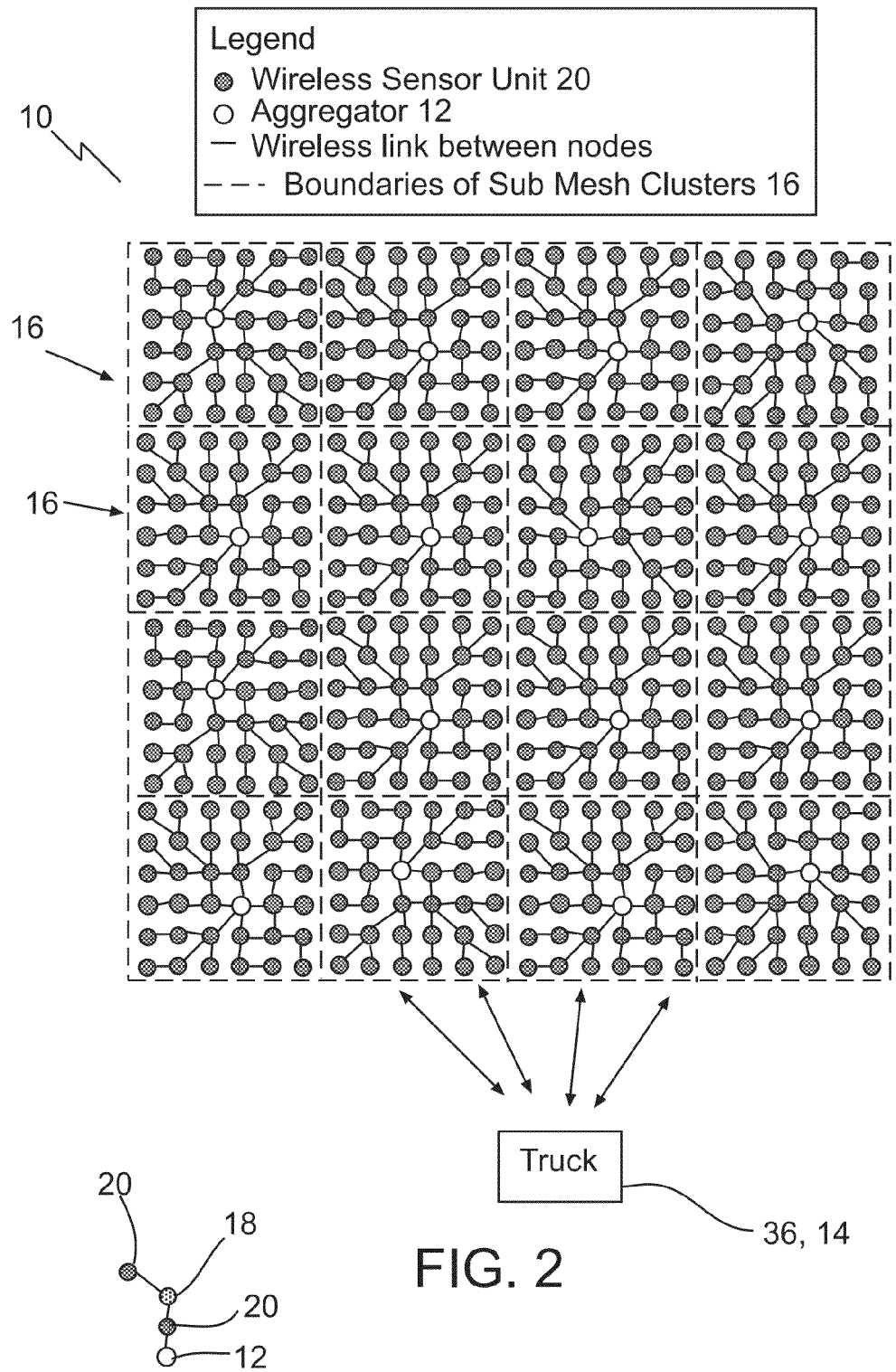
FIG. 2 shows a top plan view of a wireless mesh network comprising sixteen sub mesh clusters each with an assigned aggregator node connected to communicate between the sensor units in a respective cluster and the base control truck for substantially parallel communication between node and base.
FIG. 2A shows a portion of a sub mesh cluster incorporating a relay between mesh nodes.

Referring to FIG. 2, a wireless mesh network 10 for remote seismic recording is disclosed, comprising a plurality of wireless sensor units 20, two or more aggregators 12, and a base node 14, which may be a truck 36 or control van. The mesh devices disclosed herein may include mesh nodes (sensor units 20), a "base" node 14 for collecting data and controlling the network, and aggregators 12, which may may be connected to a sub-mesh cluster 16 on one channel or radio technology and to the base 14 on another channel or radio technology, for example using high power and/or directional antennas to increase range. One example might be a relay connected (by Ethernet) to a wireless bridge. Sensor units 20 are arranged into two or more sub mesh clusters 16 within mesh network 10. As disclosed above, each wireless sensor unit 20 has one or more sensors 22 (FIG. 1) arranged on or below a ground surface for acquiring data by sensing one or more physical parameters, each wireless sensor unit having a wireless transceiver 26 (FIG. 1) for transmitting acquired data.

Each aggregator 12 is positioned within a respective sub mesh cluster 16 and wirelessly connected to communicate directly or indirectly with the wireless transceivers 26 (FIG. 1) of each wireless sensor unit 20 of the respective sub mesh cluster 16 for receiving and aggregating the acquired data from the wireless sensor units 20. Aggregators 12 establish data aggregation points (DAPs), which may be used within the mesh to create "sub-meshes", where a cluster of nodes is managed by the DAP, including commands, configuration, control, data downloads, and uploads. DAPS communicate with the control van using a separate channel, different RF link, or cable. Base node 14 is wirelessly connected to communicate with the two or more aggregators 12 for receiving aggregated data from each aggregator 12. DAPs (used herein interchangeably with "aggregator") should be placed in the vicinity of mesh nodes, for example in a central location within the respective sub mesh cluster 16, and enough aggregators 12 should be used so that no node is more than a few hops for example away from an aggregator 12. This allows for quick transfer of packets and eliminates the long delays caused by multiple hops through the mesh, and it also enables some other improvements to the system.

One or more relays 18 (FIG. 2A) may also be used, relays 18 being essentially mesh nodes without attached data collection devices dropped in an area to close a gap between mesh nodes that are unable to directly communicate at all or to a suitable level. In conventional systems, the relay 18 is most often used to connect two nodes or two sub-mesh networks, while the backhaul is used to connect a sub-mesh to the base using an alternate radio channel or technology. Conventional seismic data collection configurations use a backhaul at the end of a (maximum practical size) string of nodes. In many ways, a backhaul unit is similar to a relay because the backhaul simply relays data to the control van 14. Thus, although conventional seismic recording systems use chains of nodes (sensor units 20) that relay data to a base node 14 through a backhaul (not shown), there is a fundamental difference between backhaul and an aggregator 12: the backhaul is transparent, while the aggregator 12 is able to store and manipulate the acquired data. In some cases, an aggregator 12 used herein may incorporate a backhaul link.

Figure 4:
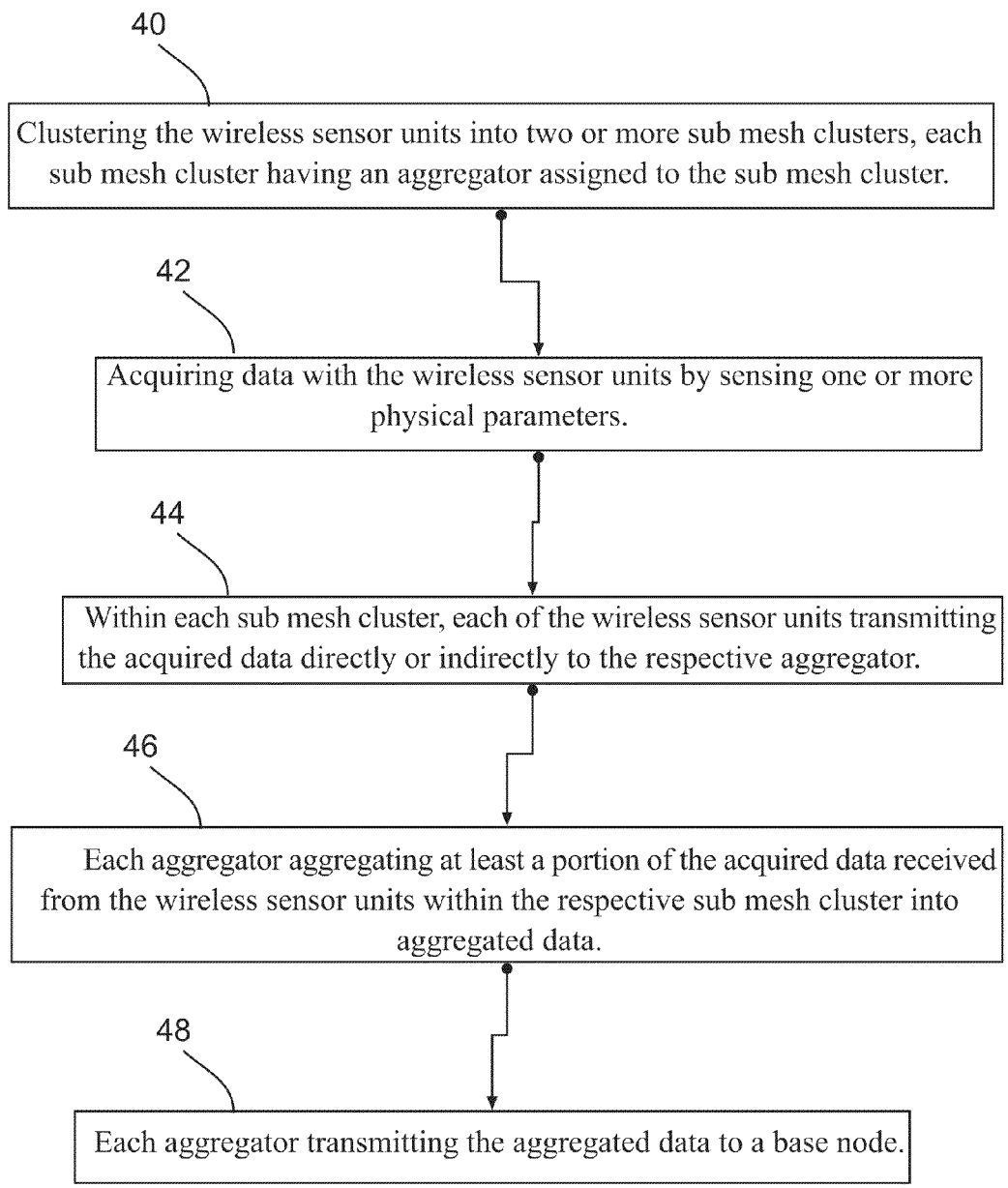
FIG. 4 shows a flow diagram of a method of collecting data from wireless sensor units arranged in a mesh network.

Referring to FIG. 4, a method of collecting data from wireless sensor units 20 arranged in a mesh network 10 for remote seismic recording is illustrated, and will now be described with reference to FIG. 2. Referring to FIG. 2, in a stage 40, the wireless sensor units 20 are clustered into two or more sub mesh clusters 16, each sub mesh cluster 16 having an aggregator 12 assigned to the sub mesh cluster 12. In a stage 42, data is acquired with the wireless sensor units 20 by sensing one or more physical parameters. In a stage 44, within each sub mesh cluster 16, each of the wireless sensor units 20 transmit the acquired data directly or indirectly to the respective aggregator 12. In a stage 46, each aggregator aggregates at least a portion of the acquired data received from the wireless sensor units 20 within the respective sub mesh cluster 16 into aggregated data. In a stage 48, each aggregator 12 transmits the aggregated data to a base node 14.

Discovery

Sub-Mesh Discovery Using Aggregators 12

Figure 3:
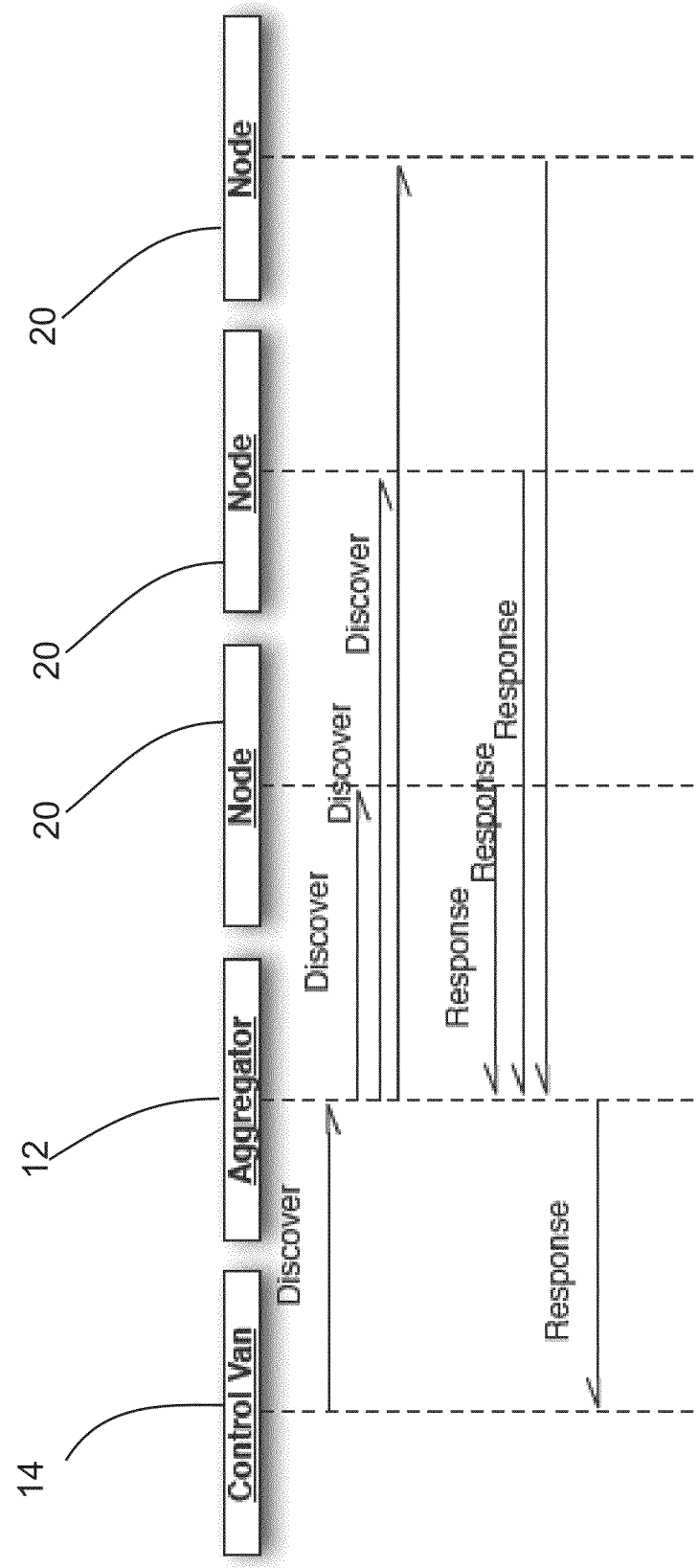
FIG. 3 shows a flow diagram of a method of discovering nodes using aggregators.

Referring to FIG. 3, for some deployments such as larger deployments, it may be practical for the control van 14 to initiate discovery by ordering all aggregators to discover, although in some cases the aggregators 12 initiate discovery without prompting by the base node 14. The discovery command transmitted to all aggregators 12 may include an order to report as well, possibly with a restriction on the number of hops to report. The restriction may allow a single frequency network for the mesh, which offers more flexibility for deployment and download. On receipt of the discovery command, each aggregator 12 acquires by local discovery a list (report) of wireless sensor units 20 within a predetermined range from each aggregator 12. The predetermined range, also referred to as the restriction above, may be defined by one or more of a maximum number of hops from aggregator 12, a maximum cluster 16 size, a maximum distance from each aggregator 12, or minimum node signal quality. Discovery reports, which may be lists of wireless units 20 for potential inclusion in the respective sub mesh cluster 16 of the aggregator 12, (as well as data downloads) from aggregators may be scheduled to avoid collisions and data overload at the control van.

When the aggregators are made responsible for discovery, the control van may receive (from each of the aggregators) a list of nodes and the number of hops from the aggregator to/from each of those nodes. Software in the control van may then cluster nodes and assign clusters to the aggregators 12, and, as above, the control van may immediately send the lists to each of the aggregators, or it may include the list with a download (or other) command.

Another embodiment uses off-line clustering algorithms in advance of deployment. Most deployments are planned well in advance and include geo-coordinates for each node. Clustering software may be applied to the database of geo-coordinates to anticipate the number and location of aggregators, relays, or backhaul units, with the details exported and projected back onto the original deployment plan. The software may aid in determining where to position the respective assigned aggregator 12 within the sub mesh cluster 16. The position of each aggregator 12 may be selected to one or more of minimize the combined number of hops from the wireless sensor units 20 in the respective sub mesh cluster 16, maximize the signal quality of the wireless sensor units 20 in the respective sub mesh cluster 16 to the aggregator 12, or maximize the signal quality of the aggregator 12 to the base node 14.

In some cases, the physical location of aggregation points is known before deployment. These locations may be based on key points in the terrain (e.g. cut line intersections, hilltops, etc.) or based on the layout of the nodes (physical layout sometimes results in physical groups close to each other, some deployments span large distances and aggregator range determines their location, etc.).

When the aggregator locations are known in advance, the clustering algorithm may proceeds as follows: 1) For each aggregator, all nodes within radio range of that aggregator are added to the cluster. The new nodes are one hop away from the aggregator. 2) For each node now in the cluster, the process is repeated, where all nodes within radio range and not already in the cluster are added to the cluster. The new nodes are two hops away from the aggregator. 3) This process continues until a hop count is reached (or there are no more nodes within range). At this point, all nodes in the network should belong to at least one cluster. 4) If any orphaned nodes exist (those that don't belong to any cluster), relays may be manually or automatically added to bridge gaps and allow the nodes to join clusters. If a node has been orphaned because it is one or two hops away from a cluster, the "maximum hop" rule may be relaxed to allow that node to join. Alternatively, additional aggregators may be added to accommodate orphaned nodes. 5) For nodes that belong to more than one cluster, the node may be exclusively assigned to the cluster with the lowest hop count to its aggregator, or, if hop counts are equal, it may be assigned to one of the clusters based on signal quality between hops, or it may be arbitrarily assigned to one of the clusters, either manually or by a random assignment.

In other cases, aggregator locations may not be pre-determined, but instead the locations may be decided based on the locations of the clusters. Nodes may be clustered based on Euclidean distance or using some other measure. Cluster size may be determined based on: a) maximum number of hops from a "central" point, b) minimum or maximum number of clusters, c) maximum distance between nodes, or d) some other suitable method.

Cluster node assignments may be determined centrally, where, for example the base node examines all aggregator lists and resolves overlap, or they may be determined by signaling between the aggregators.

Once the clusters are defined, a central point for each cluster may be determined by minimizing the number of hops to any node in the cluster. Because this usually results in several options for aggregator placement, the final decision may be made based on terrain and accessibility. The position of the aggregator may be selected based on a function which minimizes the number of hops from any node in the cluster, or based on signal quality to the mesh or the base station or based on ideal geographic location.

There are other definitions of range, including signal quality, for example signal strength, and including quality between hops. Thus, the number of hops may be used to determine whether a node is in a cluster. If a node has the same number of hops to two different aggregators, then the overall signal quality (e.g. add the signal quality values for each hop, then the "best" overall signal quality to an aggregator wins) may be used, or a user may select based on the worst signal quality on any hop to a node, etc. Basing aggregator 12 location on geographic location may be an example of maximizing signal quality.

Downloading

When a download is required, the control software may send a "download" command to each of the aggregators (using unicast, multicast, or broadcast messages). Thus, some or all of the aggregated data may be transmitted by an aggregator 12 in response to one or more transmit commands transmitted from the base node 14. The "download" command may contain a list of nodes that each aggregator is responsible for, or the aggregator may already hold a list of local nodes to download as determined by the discovery procedures disclosed herein. The download command may include a scheduled report time for each aggregator to ensure a clear channel (to reduce or eliminate collisions).

Upon receiving the download command, the aggregator 12 may extract data from each node in the list given to it by the control van. Thus, the wireless sensor units 20 may transmit the acquired data to the respective aggregator 12 in response to an aggregator transmit command from the respective aggregator 12, and the aggregator transmit command may be sent before the download command. Therefore, the aggregators 12 may get the data from the nodes, and then the aggregators 12 send to the base station 14. Downloads may be done serially or in parallel. At some point (either during the RSR-T download process or once it's complete, or according to the assigned download schedule from the control van), the aggregator initiates a download from its memory down to the control van.

The one or more transmit commands from the base node 14 may contain a schedule of one or more unique transmit time slots for each aggregator 12 to transmit the respective aggregated data without interfering in the transmissions of other aggregators 12. This scheduling of aggregators allows a user to turn an unscheduled Carrier Sense Multiple Access (CSMA) network (i.e. 802.11) into a scheduled network. While the underlying mesh 16 may be CSMA, by collecting data locally and by scheduling the aggregators, a user may get away from the slotted ALOHA system and improve overall network performance, simply by scheduling aggregator downloads. This leads to the concept of scheduled "buffer-and-dump" from the aggregators 12.

Each unique transmit time slot may be selected based on one or more of the size of the respective sub mesh cluster 16, throughput requirements of the respective aggregator 12, or another suitable parameter(s). Scheduling in such a fashion scales nicely because aggregators 12 with large clusters may be assigned longer slots or may be assigned slots more often. Aggregators 12 may optionally be polled for download scheduling, and again, the base station 14 may determine when to schedule and how much to schedule based on the parameters above.

In some embodiments collection by the aggregator 12 may come before the download to the base station 14. Thus, the aggregator 12 may autonomously trigger, for example using an aggregator download command, downloads from local Remote Seismic Recording transmitters (RSR-Ts, also referred to as sensor units 20) based on time or some other trigger besides an explicit request from the control van. The RSR-T may be configured to periodically send all or some data to the control van, and the configuration may include a flag to transmit directly to the control van or to transmit to the nearest aggregator). The RSR-T may receive a "download" command directly from the control van. In this case, it may download directly to the control van (through the mesh) or may initiate a transfer to the aggregator.

(Near) Real-Time Downloads

Aggregating may further comprises each aggregator 12 processing the acquired data to produce processed acquired data of reduced transmission bandwidth requirements than the acquired data, in which the processed acquired data is then aggregated to produce the aggregated data. For near-real-time operation, small packets from each RSR-T may be aggregated and passed on to the control van. Data may then be transferred from the RSR-T to the aggregator on demand or in a scheduled manner for example. When the aggregated packet containing data from each of the streaming nodes is ready, the aggregator may transmit the packet to the control van. The aggregator may also be placed in "streaming" mode, where it accumulates data until the outgoing packet is a specified size or until some time limit has been reached, then the aggregator sends the packet(s) to the control van.

A Real-Time Example

Assume a modest sub-mesh where the number of hops from any node to the aggregator is 5 hops. Assume also that the backhaul unit is capable of 22 Mbps, and we have a fairly high real-time data rate of 512 kbps from each node. In this example, the node-to-node data rate is 10.8 Mbps, the two-hop transfer rate is 5.15 Mbps, the 3-hop transfer rate is 3.13 Mbps, the 4-hop transfer rate is 2.26 Mbps, and the 5-hop transfer rate is 1.67 Mbps. These example rates were taken from actual field measurements. At 5 hops the link may still carry 1.67 Mbps through to the endpoint, so 512 kbps should not be an issue.

As data from a node is passed through another mesh node for re-transmission towards the end receiver, the data rate requirements accumulate because the relaying node is also adding data from its own sensors. The required data rate increases linearly. However, as the number of hops increases, the data rate drops off exponentially until settling at a "floor" where the mesh has taken on a "bucket brigade" model.

To confirm:

the far node is 5 hops away and is using a 1.67 Mbps link to support 512 kbps the next node is 4 hops away and is using a 2.26 Mbps link to support 1.024 Mbps the next node is 3 hops away and is using a 3.13 Mbps link to support 1.536 Mbps the next node is 2 hops away and is using a 5.15 Mbps link to support 2.048 Mbps, and the near node is 1 hop away and is using a 10.8 Mbps link to support 2.560 Mbps This means that one aggregator may theoretically support up to Floor[22 Mbps/512 kbps]=42 nodes, real-time. With higher data rate requirements (and to allow for some margin of error), one may consider something in the order of a maximum of 4-6 hops for nodes assigned to an aggregator. Depending on layout and range, one may easily manage 20-40 nodes with each aggregator. Again, if we place the aggregator in the middle of the sub-mesh, 5 hops in each direction quickly adds up to a large coverage area.

Processing may further comprise determining a representative data set to transmit to the base node 14 as the aggregated data. Thus, to reduce real-time traffic, one or more nodes in a cluster may be selected as "representative data", and there may be numerous ways to do this. For example, the representative data set may further comprise one or more of the acquired data from one or more wireless sensor units within the respective sub mesh cluster, an average data set of the acquired data of the wireless sensor units within the respective sub mesh cluster, and a median data set of the acquired data of the wireless sensor units within the respective sub mesh cluster. The operator may hand pick nodes based on experience, location, or other suitable factors, and the aggregator may perform some pre-processing on the data and select one or more nodes based on the fact that they are a good representation of the data (average, median, etc.) or nodes may be selected based on the type of data they produce (higher resolution, lower resolution, or some other feature). Many options exist for compression of data at the aggregator which results in reduced network load, and these may be applied before transmitting aggregated data to the base station.

Compression Based on Similarity of Seismic Readings

Processing may also be used to provide compression of the data, compression being another example of a task not carried out by a conventional backhaul unit. One characteristic of the data coming from the nodes is that nodes in the same area tend to have similar seismic shot profiles. In many cases, "real-time" display of data readings is required so that the operator may have a general idea whether the readings are as expected or if changes to the system are required. Therefore, it's often sufficient to take a "thumbnail sketch" of the data in an area and examine it "real time".

The aggregators provide such a method where a representative data set (from one node or the combination of data from several nodes) is sent to the base. The representative set may be a "median" set from one node that represents similar readings in the rest of the sub-mesh. Similarly, a set of average values for each sample may be combined and sent to the base as a single reading.

Another way to reduce over-the-air traffic is to transmit one full data set from a node in the sub-mesh and additional (smaller) data sets representing the difference (delta) for each node in the mesh. Again, because data sets taken in the vicinity of each other tend to be similar, sending the differences often results in less transmission resources being used. Thus, processing may further comprise producing from the acquired data from each wireless sensor unit respective data sets of offset values relative to the representative data set to transmit to the base node as part of the aggregated data.

Processing may include post-processing of data often carried out by base node 14 in conventional systems, for example stacking, averaging, and other suitable analysis techniques. If processing is done before transmitting directly to base node 14, bandwidth is saved for transmission of the aggregated data. Before transmitting to the base node 14, processing data from one or more nodes in the cluster may be carried out in a manner similar to what is currently done in post-processing procedures at the base node 14.

Data Quality Checks

While useful for compression, the similarity of incoming data from nodes near to each other may also be used for upstream data quality checks. The aggregator may perform coarse comparison of data sets from nodes and alert the base if one or more nodes sends data that is significantly different than most nodes in the area. Thus, each aggregator may compare the acquired data between wireless sensor units and alert the base node if the acquired data from one or more of wireless sensor units differs by more than a predetermined range from the acquired data sets of other wireless sensor units.

Mesh Status Alerts

Each aggregator may status poll the wireless sensor units within the respective sub mesh cluster and generating a status report, and each aggregator may transmit the status report to the base node. Because each aggregator is responsible for a (smaller) sub-mesh, some light status polling (from the aggregator) or beacon signals (from the nodes, e.g. HELLO) may be performed within the sub-mesh, and if the aggregator senses an issue (such as the loss of a node, described above), it may conduct further tests on the node in question or query the other nodes in the sub-mesh before creating a report to send to the control van. This micro-management of the sub-mesh improves the visibility of the mesh from the control van without adding a significant load to the network.

Simplified Network Channel Isolation/Joining

The base node 14 may transmit a channel change command to an aggregator 12, and the aggregator 12 may transmit a signal to each of the wireless sensor units within the respective sub mesh cluster to change channels. One issue in the field is the requirement to change the mesh operating frequency (channel). The operator must be very careful to change nodes in exactly the right order, and this results in a long delay while the outermost nodes are switched, followed by those one hop closer to the control van, and so on, until finally the last nodes are switched to the new channel and then the control van may switch over to see if the network is still there.

Using aggregators, centralized channel re-assignment may be simple: the control van operator assigns a channel for each sub-mesh and commands the aggregator for each sub-mesh to perform the switch-over. Each aggregator then sends a "channel change" command to the nodes on its list (in a similar manner as described above) and finally it switches to the new channel.

Locally, the aggregator polls each node on its list to verify they have all successfully changed channels, and in the event of a failure, the aggregator may be able to switch back to the original channel and try again with orphaned nodes. Failing that (a distant node is orphaned), the aggregator may notify the control van while the rest of the network continues to operate.

Similarly, it is a simple process to switch all nodes on the mesh to the same channel by relying on the aggregators to manage individual nodes within their sub-meshes. Because it's done in parallel and monitored locally to each sub-mesh, the process is faster and easier than with centralized channel changes.

When the aggregators are on a different network (channel, radio technology, etc.) than the mesh nodes, they may be used to re-configure the network as described above without fear of loss of connection to the network. Similarly, when the mesh network is fully connected, control messages for the aggregators may be passed through the mesh, allowing channel assignments, communications parameters, etc. to be changed from the backhaul portion of the aggregators without fear of loss of connection. In a manner similar to the sub-mesh channel assignment, the backhaul frequencies for an aggregator may be changed by sending a control message through the mesh network.

Timestamps

In some embodiments, each of the wireless sensor units 10 transmits acquired data to the aggregator 12 without timestamps, and one or more timestamps is added to the acquired data at the aggregator level or base node level. Data reading timestamps are another load on the data path, as they are required to mark the data for post-processing. Because the aggregator may be central to a cluster of nodes, it may obtain a reference timestamp from each node under its care, and from that point allow nodes to include a reduced resolution timestamp with each packet of data. Thus, the acquired data may be transmitted with one or more time offsets relative to a reference timestamp to allow calculation of the one or more timestamps at the aggregator level or base level. Once the relative time offsets for each node are known to the aggregator, the nodes need only send an indication of the offset from the base time reference and the aggregator (or base) may insert (rather than transmit over-the-air) full time stamps for each data set.

The acquired data may also be transmitted at one or more scheduled times to allow calculation of the one or more timestamps at the aggregator level or base level. For example for real-time data, samples may be collected at regular intervals from all nodes in the cluster. Rather than an individual timestamp on each sample or group of samples, the aggregator may time-align samples and add a simple header (for example) containing the start time, number of samples, and time offset between samples. At the base station, time stamps may be added back to the data for processing.

Other Features

The aggregators 12 may be accessed by the base 14 on the same mesh as the nodes, or they may be on a separate network from the nodes. The separate network may be another mesh or it may consist of direct (point-to-point) links to/from the base. Another alternative is that meshed aggregators may communicate with the base over a single (or more) point-to-point backhaul units. Some alternatives are a) all nodes, aggregators, and base are on the same mesh network, b) aggregators are on a separate network, meshed together with the base, c) aggregators are on a separate network with point-to-point links to the base, or d) aggregators are on a separate meshed network with a point-to-point link between the aggregator mesh and the base station.

Downloads may be "full" real-time with all nodes streaming data to the base in real time, using the aggregators to encapsulate small data packets from each node into large packets, saving overhead. Downloads may be non-real-time, pulled from nodes or from aggregators at will. Downloads may be a combination of the two, with some nodes reporting in real time while data from other nodes or portions of data from nodes are stored in the aggregators for later non-real-time downloads.

One aspect of the network is that it may be a "single frequency network" with all nodes on the same frequency and in the same mesh. In this case, some nodes may report directly to the base station while others report to an aggregator. Similarly, control signals may be routed directly to a node or may be relayed through an aggregator.

If a multi-tier network is used, where the nodes mesh in clusters and the aggregators use a different radio technology, frequency, channel, or connection type, the aggregators may stream some nodes from their clusters while storing data from other nodes in their clusters for later non-real-time downloads. This is similar to the discussion of "representative data" elsewhere in this document, and may include some nodes being selected to represent the cluster 16, or some data chosen to represent the data in the cluster (averaging, etc.).

Along similar lines, when the network is so large that it cannot stream all traffic in real time, a "spotlight" mechanism may be used where clusters or even parts of clusters are streamed in real time while data from the other nodes is stored for later non-real-time retrieval. The operator may dynamically "move the spotlight" over the network, effectively shining the real-time spotlight on different parts of the mesh at different times, which allows the operator to selectively probe the current readings from specific parts of the mesh in real time.

Regarding discovery, in a single frequency network, when an aggregator receives a "discover" command from the base, the aggregator may carry out its own local discovery process, and then report back to the base station with a neighbour list (including sample data below). Optionally, each aggregator may initially respond with an acknowledgement to the base indicating that it is an aggregator and it is initiating a local discovery scan, so that the base station knows how many aggregators are expected to report back later with cluster node lists.

If the network is multi-tier (a mesh of nodes and a separate network of aggregators), the base may request (using the aggregate network) the aggregators to discover, but it may also conduct its own discovery on the node mesh. This may allow it to discover any orphaned nodes.

Regarding overlapping nodes between clusters, one solution is that all of the aggregators report their lists to the base station, and the base station discovers redundancies, culls the lists, and sends updated lists back to each of the aggregators. Fixing overlaps may also be carried out by the aggregators independent of the base station. For example, each aggregator may send its list to all other known aggregators. The list must be transmitted any time a change has been made to it (including initial creation of the list). When a second aggregator receives a list from a first aggregator, it checks that list against its own list. If there are any duplicate nodes, the second aggregator decides whether to keep the duplicate node or give it up to the first aggregator.

If the second aggregator decides to keep the node in its own list, it sends a response to the first aggregator indicating that the first aggregator should drop the node from its list. The first aggregator has two options: a) agree to drop the node, in which case it updates its list and sends a unicast acknowledgment that it has dropped the node, or b) disagree to drop the node, in which case it sends a unicast negative-acknowledgement (NACK) to indicate that the second aggregator must drop the node.

If the second aggregator receives a NACK from the first aggregator, this indicates that the first aggregator has not agreed to drop the node, and the second aggregator must drop the node from its list. If the second aggregator decides to drop the node, it does so immediately, then broadcasts its new list. No unicast message is required in this case.

Figure 5:
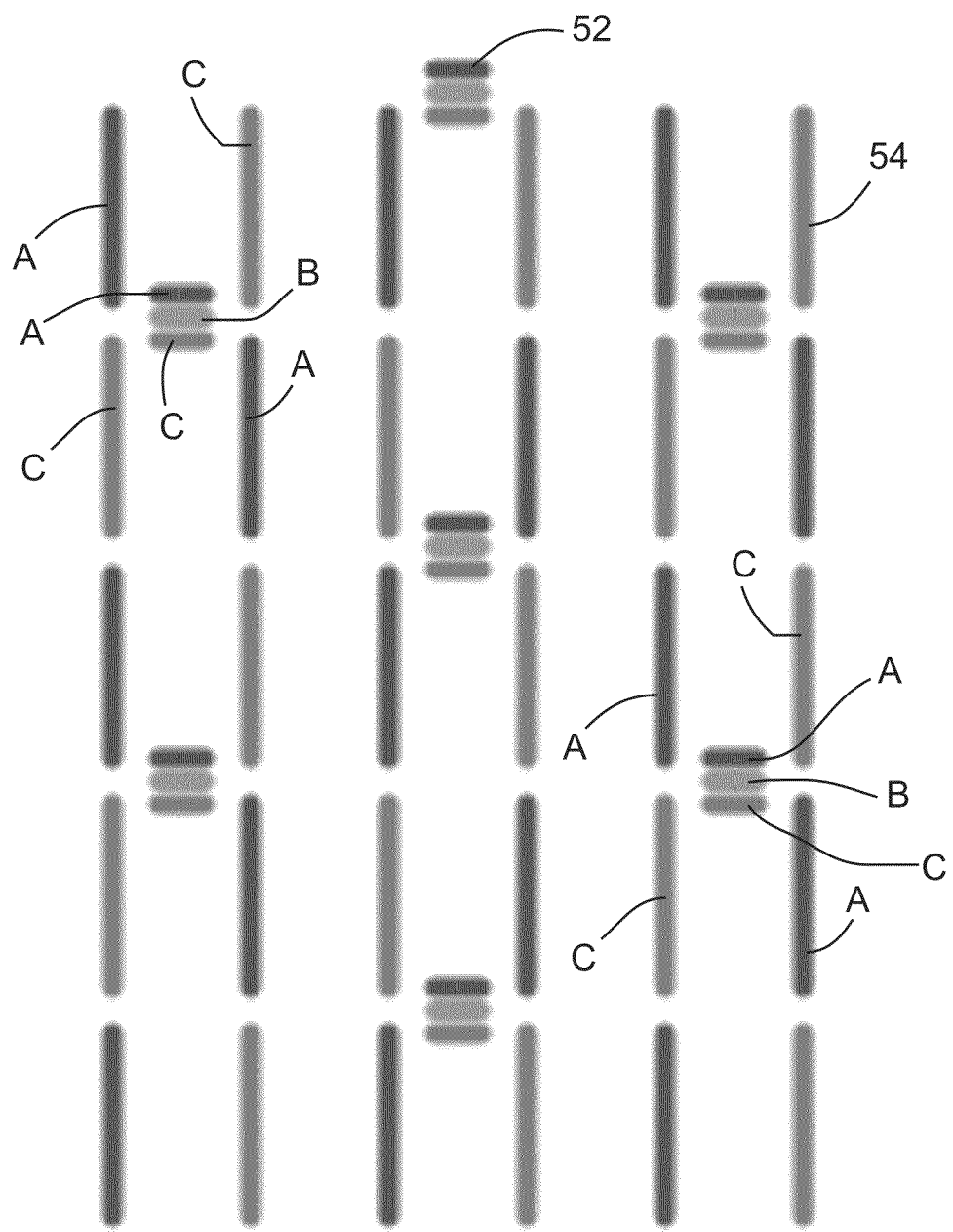
FIG. 5 shows a six-node per sub-mesh channel configuration with aggregators between the lines.
Figure 6:
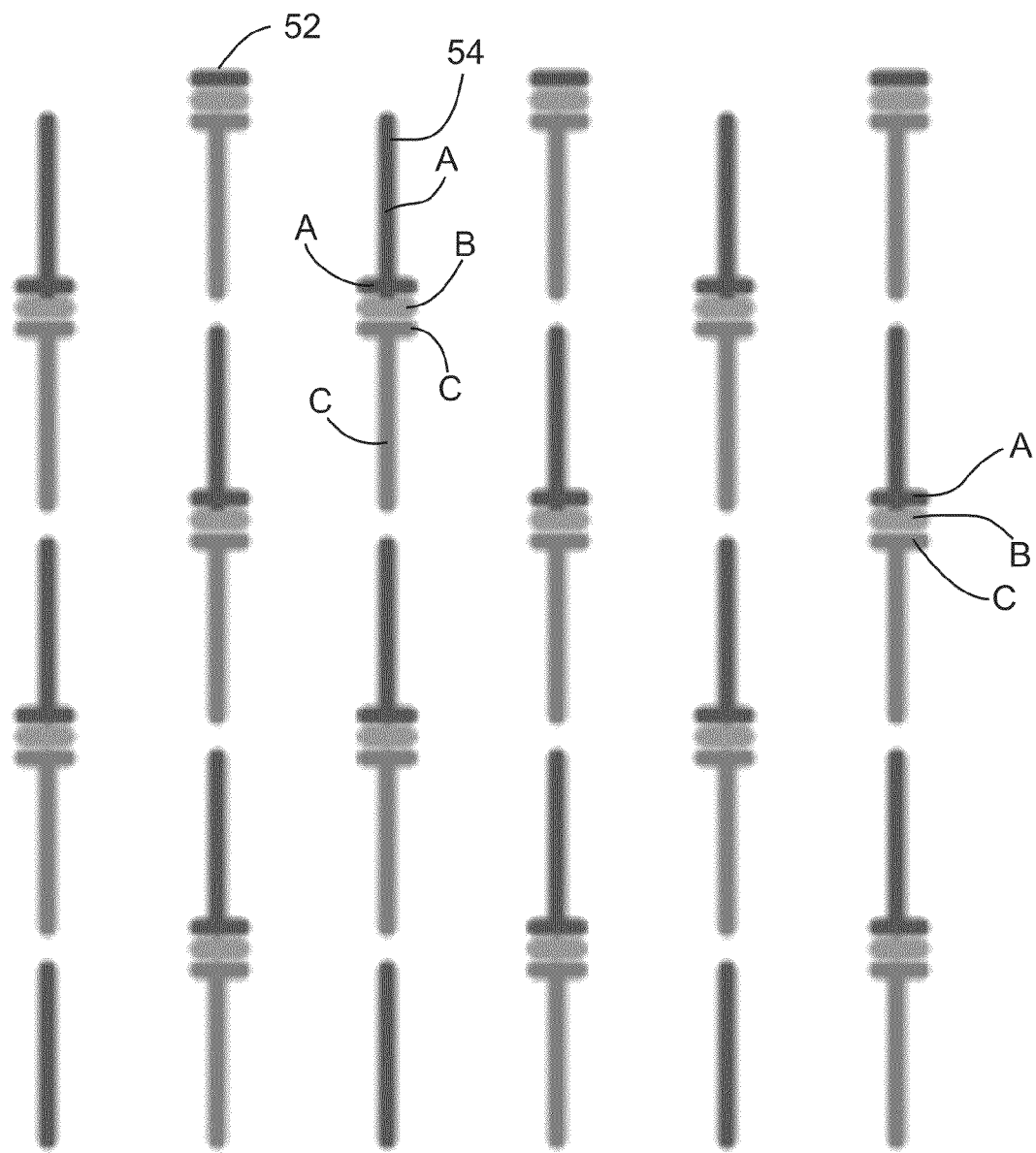
FIG. 6 shows a 2-channel configuration with aggregators between the lines.

Further embodiments will now be described. In FIGS. 5-8, each aggregator 52 is shown by a set of horizontal bars of different shading, each shading corresponding to a different channel or set of radio frequencies. Similarly, each sensor cluster 54 is shown by a vertical bar, which has different levels of shading, also corresponding to a different channel or set of radio frequencies. The different channels are represented both by the shading and the letters A, B, C and D. The shades of the clusters and aggregators are meant to match with each other to indicate the ability to communicate between each other. Referring to FIGS. 5 and 6, the lines indicated by reference characters A and C within each aggregator correspond to the two types of shadings of clusters within the figure, showing that each cluster is capable of communicating on one sub-mesh channel corresponding to the shading and the letter reference A, B or C. The line indicated by B show the aggregator has a radio channel specific to the mesh level of the aggregators, which includes communication with the control truck.

Figure 7:
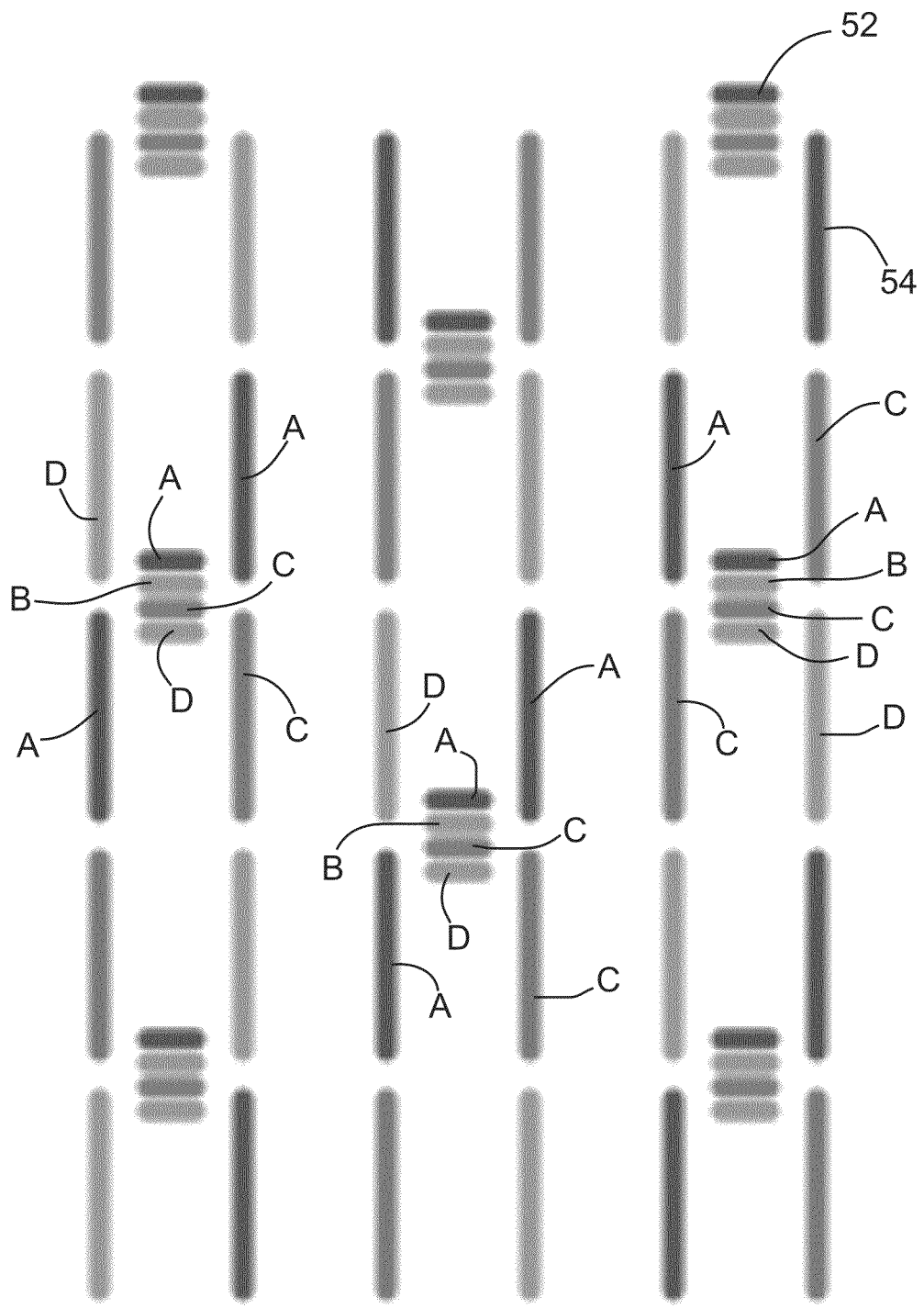
FIG. 7 shows a 3-channel configuration with aggregators between the lines.
Figure 8:
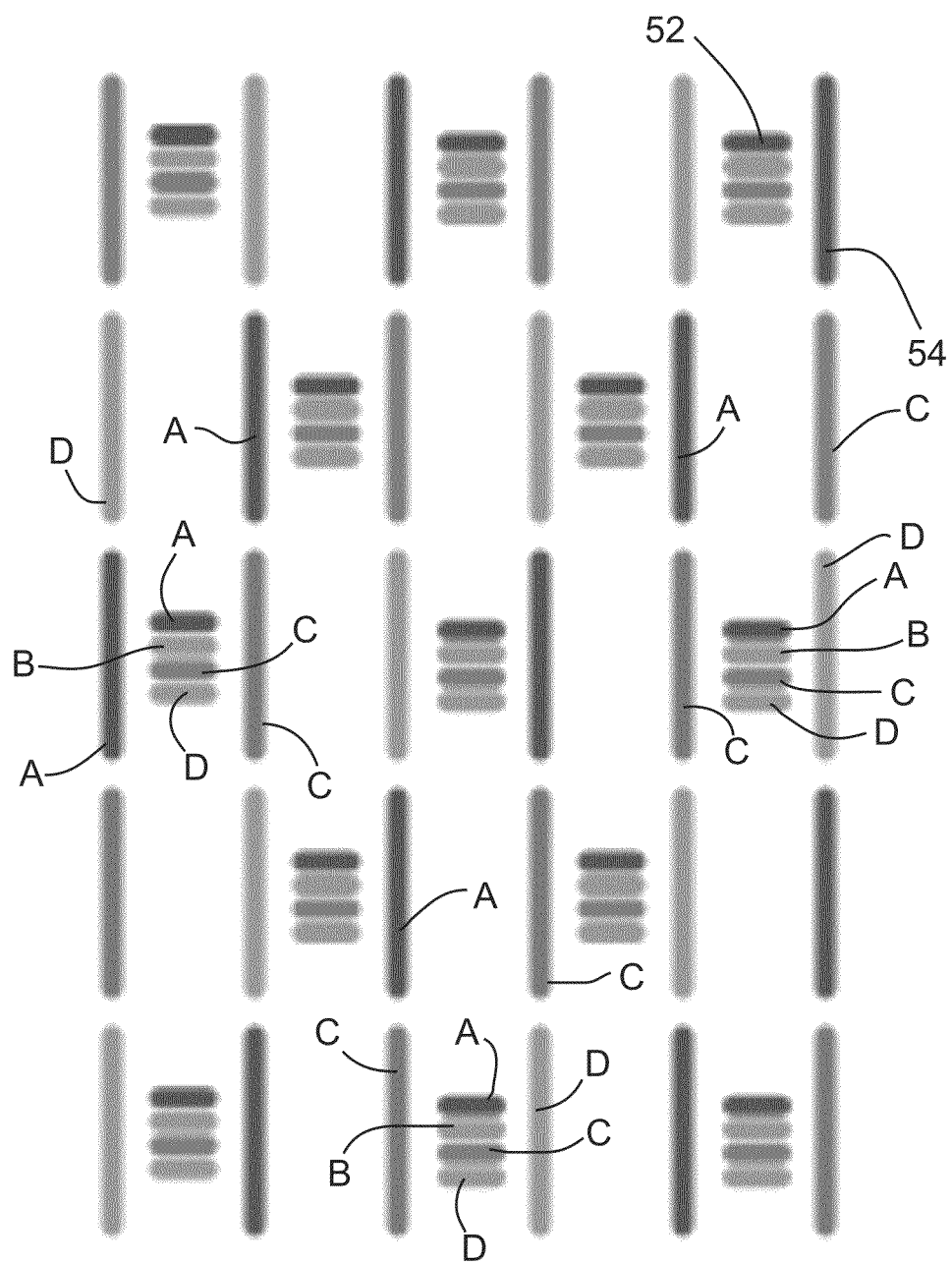
FIG. 8 shows a 3-channel configuration where the placement of the aggregators between the lines is located mid-way along the sub-mesh.

FIGS. 7 and 8 adds a fourth shaded bar to the aggregator 52, indicated by reference character D. The embodiment of FIGS. 7 and 8 is a three-channel configuration, wherein bar D corresponds with a third sensor cluster 54 that transmits acquired data on the corresponding channel in the aggregator 52.

Figure 9:
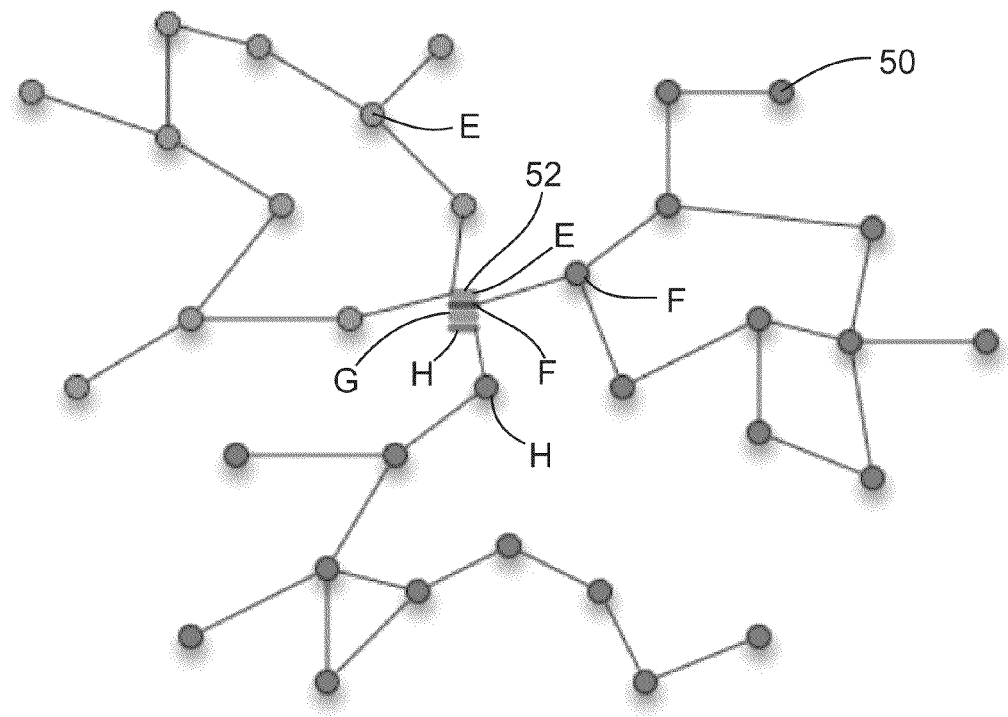
FIG. 9 shows a 3-channel configuration in an arbitrary mesh configuration.

Referring to the embodiment in FIG. 9, the wireless sensor units 52 are spread out in an unstructured manner. Similar to FIGS. 5-8, each wireless sensor unit 52 is shaded to match the corresponding horizontal bar of the aggregator 52 in the centre of the figure and is thus configured to communicate specifically with that frequency of the aggregator. The three clusters are assigned channels E, F and H with corresponding channels used by the aggregator 52. The aggregators 52 in this embodiment communicate at the aggregator level with a control unit on a channel G.

Figure 10A:
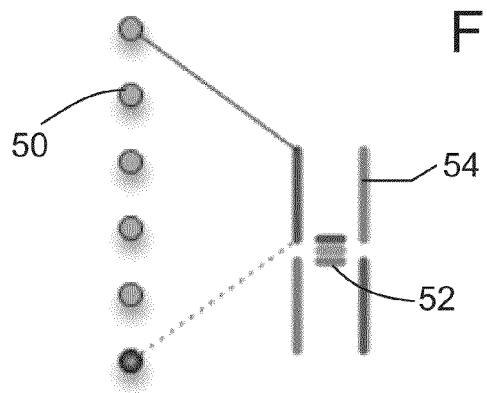
FIG. 10A shows an example channel configuration where the cluster has a single link node.
Figure 10B:
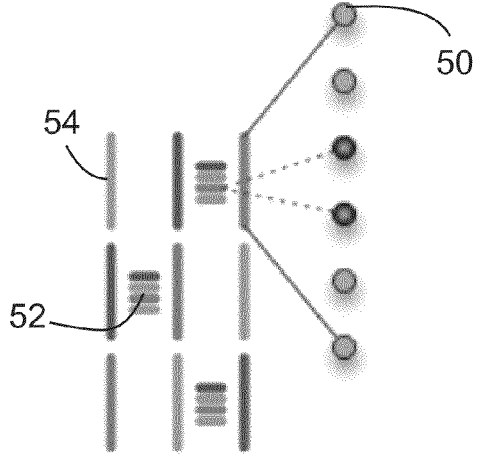
FIG. 10B shows an example channel configuration where the cluster has two link nodes.

Referring to FIGS. 10A and 10B, an illustration of the structure of the wireless sensor units 50 within a wireless sensor unit cluster 54 is shown. In FIG. 10A, where there are only two sub-mesh channels, the single highlighted wireless sensor unit 50 represents the link node, which is the final throughpoint for data destined for the corresponding aggregator 52. In FIG. 10B, with an additional sub-mesh channel, multiple shaded wireless sensor units 50 indicate that multiple link nodes may be used. The link nodes are typically positioned to be physically nearest its corresponding aggregator. In other words, the link nodes are selected to be those within range of the corresponding aggregator.

CC (Central Controller)

The central controller is a root node that is also typically the sink for all the data in the mesh. There may be more than one CC in a deployment, but typically a node only sends data to and is under the control of one CC.

L1 Aggregator (L1)

A Layer 1 aggregator harvests data from a sub-mesh or set of sub-meshes. L1s are typically meshed together and connected by that mesh to the CC or connected by a Layer 2 mesh to the CC. Because the L1 connects to a mesh of other L1s, it typically has a radio distinct from the radio(s) required to communicate with the mesh nodes, but this is not a requirement. A typical L1 aggregator as described in this disclosure may contain 2, 3, or more radios. A preferred embodiment contains one radio for the L1 mesh and one radio for one or more node meshes.

Link Node

The link node (or nodes) in the node-mesh. It is physically located near the L1 aggregator. Data destined for the L1 aggregator (and eventually the rest of the network) passes through the link node to get to the L1 aggregator, and data destined for the node mesh pass from the L1 through the link node to the node mesh.

There may be more than one link node in a sub-mesh, and multiple link nodes may be used at the same time. For example, if the L1 is situated near the middle of a linear sub-mesh, two link nodes can be used to harvest data from either end of the sub-mesh. Alternatively, if two sub-mesh nodes are within range of an L1, they may alternate serving as link nodes to balance battery load.

Node Sub-Mesh

The node sub-mesh is a group of nodes gathering data. The data from this mesh is harvested by an L1 aggregator. A node sub-mesh may contain one or more link nodes, and link node designation may change. The sub-mesh may be a linear mesh or a random cluster of nodes.

Off-Channel State

In this state, the L1 aggregator is not connected to a given sub-mesh. The L1 aggregator may or may not be on the same channel as the sub-mesh.

On-Channel State

In this state, the L1 aggregator is connected to a given sub-mesh through one or more link nodes, allowing data to flow from the sub-mesh to the CC.

Background

Large scale mesh networks such as those used to harvest data from seismic arrays tend to suffer from noise interference, especially if nodes use the same RF channel. To overcome this problem, grids of wireless transceivers are arranged onto separate channels, and multi-channel aggregators are used to harvest the data from groups.

In FIG. 5, sub-mesh nodes are arranged in rows of, for example, 6 nodes per sub-mesh. A six-node sub-mesh is indicated by a long shaded vertical line, with the line shading indicating a unique RF channel. For this configuration, aggregators are placed between columns of sub-mesh groups. The representation of the aggregator includes different shading to indicate that the aggregator can communicate on either of the sub-mesh channels, and also a further bar to indicate a radio channel specific to the aggregator mesh. With this configuration, each aggregator is within range of and is able to harvest data from four sub-mesh groups.

In FIG. 6, an alternative configuration is presented. In this case, the aggregators are placed in line with the mesh nodes, and data is harvested from the line ends. This configuration may be more appropriate, for example, if the line spacing does not permit connectivity with the sub-mesh groups from between the lines.

Next, a 3-channel version is shown in FIG. 7, again with the aggregators located between lines of meshed nodes. Again, each vertical line (e.g. the orange line segment) contains some number of wireless nodes meshed together and sharing the same channel.

FIG. 7 shows 3-channel scenario with aggregators placed between lines and located mid-way between sub-meshes (as opposed to at the intersection of sub-meshes).

While placing aggregators at the intersections of multiple lines can be more efficient, they can also be located mid-way along the sub-mesh, as shown in FIG. 8.

Sub-meshes can also be configured in a less structured layout as shown in FIG. 9. In the figure, note that one sub-mesh has two potential link nodes in range of the L1, and either or both of these nodes can serve as the link node.

As stated earlier, in FIGS. 5-9, the vertical shaded bars represent a linear cluster of nodes. Two examples of the (6-node) detail of a line are shown in FIGS. 10A and 10B.

One way to construct such an aggregator is to build it with one radio for each sub-mesh RF channel and an additional radio to allow it to mesh with other aggregators. If two RF channels are used for the node sub-meshes, the aggregator would require three radios. If three RF channels are used for the node network meshes, then the aggregator would require four radios.

With this type of aggregator construction, the multi-channel system is transparent to the node transceivers and the network. However, it comes at a high cost in equipment and in power consumption, and it requires a more complex antenna system at the aggregator (one antenna per radio).

Single Node-Mesh Radios in Aggregators

A more cost effective solution for these aggregators would be to use one radio for the aggregator mesh and one radio for the node mesh, where the node mesh radio harvests data from each of the node mesh channels one at a time by selecting the appropriate RF channel: harvesting the data, and then selecting the next RF channel and repeating the process. The single node-mesh radio configuration provides significant benefits over the multi-radio solution.

First, there is the obvious hardware cost benefit. Using one radio instead of three, for example, cuts power consumption for the sub-mesh connections by ⅔. Also, if separate radios are used, each requires an antenna, and this increases the size and complexity of the aggregator node.

Another issue with the multi-radio setup is adjacent channel interference. Even on non-overlapping channels, radios in very close proximity (the antennas would be integrated into the same mask) suffer from adjacent channel interference. Using a single radio multiplexing multiple channels resolves this issue.

Implicit scheduling that comes as a side effect of this channel switching technique also provides opportunities for efficiency enhancements at the aggregator and the node level.

While it is clear that the techniques and benefits in this disclosure were created with a single node-mesh radio on the aggregator, many of these techniques can also be used with an aggregator containing multiple node-mesh radios. For example, scheduling off-channel time for a radio that only harvests from one channel allows scheduled power saving time and also provides a reference time to nodes in the sub-mesh, allowing those nodes to also schedule power saving time as well as contention-free transmit time.

Capacity

The most important requirement is that the L1 aggregator has enough capacity to harvest data from the nodes in the node-meshes feeding it. Typical data rates from the node-mesh are in the order of 32-bit samples taken at each node every 1 ms. With 6 nodes in a node-mesh, the L1 must extract 192 kbps from each node-mesh. For 2 node-meshes, the L1 extracts 384000 kbps.

For the purposes of this disclosure, it is assumed that the data rates of the nodes in the mesh and the L1 aggregators are sufficient to carry data at the required rate. In the event that the data harvest rate does not meet the required rate, some mechanisms are included in this disclosure to signal the nodes and controller and also to adjust the data harvest rate.

Note that the larger the number of hops between the source and the destination, the slower the overall data rate. One aspect of this invention takes advantage of the "off-channel" time to move all of the data to be passed to the L1 aggregator to the link node, optimizing the available transfer time while the L1 aggregator is attached.

Coordination

A related issue is timing coordination between the L1 aggregator and the sub-meshes it harvests. Some signaling is introduced to help other optimization techniques. For example, when each node in a sub-mesh completes transfer of its data (for the current time slice) to the link node, it may indicate completion with a message sent to the link node. When the link node has received indication from all nodes in the sub-mesh that they have completed all transmissions, it may send an message to the entire sub-mesh, allowing the devices to enter a reduced power state until it is time to transfer data for the next time slice.

Figure 11:
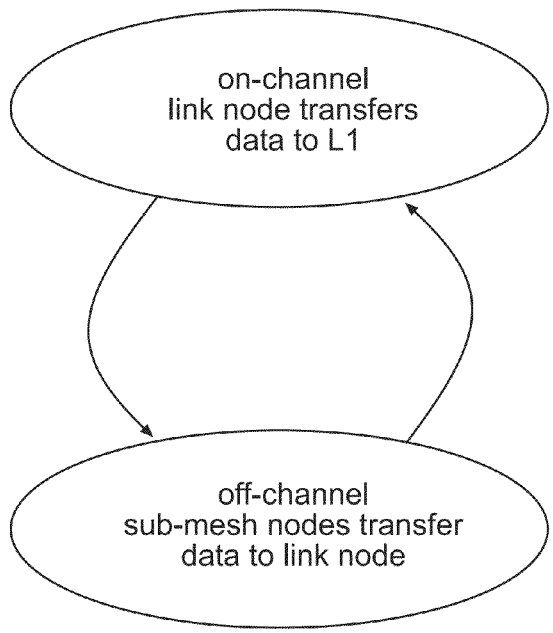
FIG. 11 shows a diagram of the two modes of operation from the node-mesh perspective.

From the node-mesh perspective, there are two modes of operation: "on-channel" (where the L1 is connected to the sub-mesh), and "off-channel" (where the L1 is connected to a different sub-mesh, either on a different channel or on the same channel as this sub-mesh). During the on-channel state, the primary function of the sub-mesh is to transfer data to the L1 (through the link node). During the off-channel state, the primary function of the sub-mesh is to transfer data to the link node. The states are illustrated in FIG. 11.

Several enhancements in this disclosure are based on the nodes knowing the start time and duration of each on-channel and off-channel state. There are several ways to communicate these times:

Pre-determined on-channel and off-channel start and duration (signaled periodically)

Explicitly signaled start times for on-channel and off-channel states

A combination of pre-determined and signaled times/durations

Once during start-up or every several frames, the L1 may notify the sub-mesh of the duty cycle between on-channel and off-channel for that sub-mesh. This method uses the least amount of bandwidth but is the least flexible. Changes to the duty cycle can be communicated immediately, but it may take a cycle for the sub-mesh to react to the change.

Explicitly signaled duty cycles can be sent as part of the start of an on-channel time slice. In this case, the link nodes know the duration and can communicate this either immediately or during the next off-channel period.

Another alternative is to pre-designate on-channel times but allow the L1 to leave the channel after completing data transfer. This would allow the node-mesh radio in the L1 to schedule some power saving periods.

There are cases when a node needs to send or receive unanticipated messages. To accommodate this, the L1 may schedule some additional time on-channel where no data transfer is planned, but this allows nodes to release messages (outside their regular data transfer) to outside the sub-mesh.

Link Node Designation

Link nodes may be designated in a number of different ways. The primary criteria for a link node is that it is situated close to an L1, preferably one or two hops away. Changing link nodes is a good way balance power consumption among nodes in the sub-mesh, so provisions are made to allow this. With some coordination at the L1 level, the link nodes may even "swap ends" and use a different L1 for some data transmission.

Packet Buffering

Nodes in the off-channel sub-meshes may have messages to be sent to other nodes outside their mesh or to the CC. Because there is no connection through the L1 during the off-channel period, these messages must be buffered at the link node until the next on-channel period.

Data destined for an off-channel sub-mesh must be buffered by the L1 serving that sub-mesh until the next on-channel period for the sub-mesh.

When the link node enters the off-channel period, it begins buffering data destined for outside the sub-mesh and it starts a timer to the next on-channel period. If this timer expires, it may indicate that the sub-mesh has lost connectivity to the L1, so the link node broadcasts a route request to the destination(s) of the packet(s) in an attempt to find a new route for the data. If the route request fails (timeout or other failure), the link node drops the packets and may de-register itself as the link node for the sub-mesh.

When the L1 switches a sub-mesh to off-channel, it begins to buffer any data received for that sub-mesh. Once it reestablishes the channel link to the sub-mesh, the L1 forwards its buffer contents to the sub-mesh through the link node. If it is unable to re-establish a link to the sub-mesh through the link node, it may attempt to establish a link through another known node in the sub-mesh before flushing the data buffer (in the event of complete failure to re-establish the connection). If the L1 is unable to establish a connection with the sub-mesh, it may flush the destination IP addresses for the nodes in that sub-mesh from its routing table, and send an indication back to the CC.

In the case where there are two or more link nodes, each one collects data from nodes in sub-groups. Multiple link nodes and the sub-groups serving them may be assigned by the CC or may be negotiated within the sub-mesh based on location or some other criteria.

Figure 12:
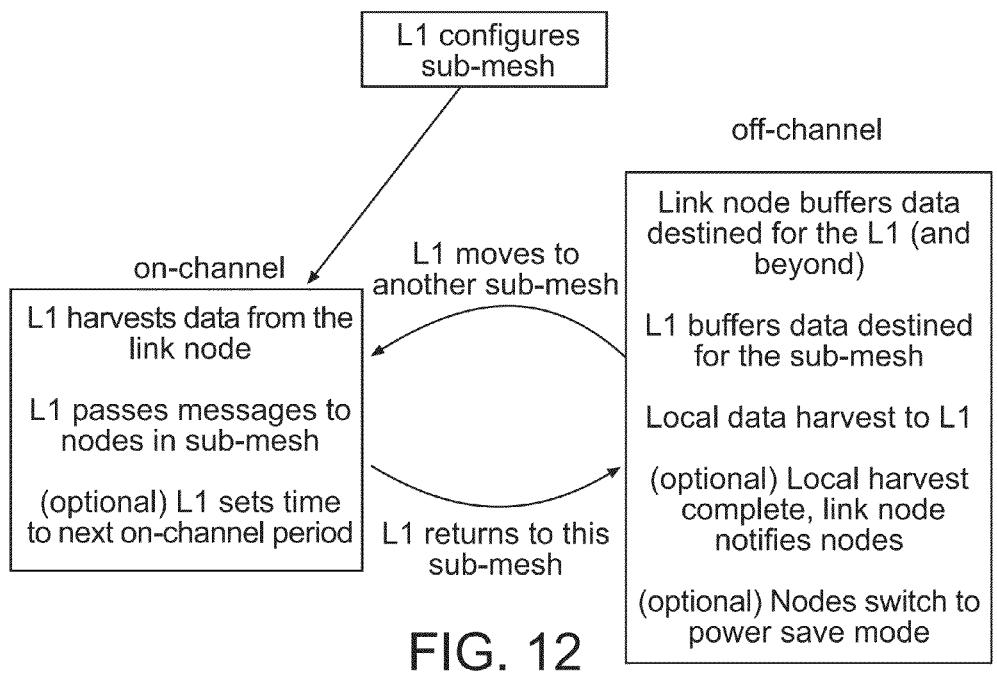
FIG. 12 shows a flow diagram of the states and modes of on-channel and off-channel operation.

Another view of the states and modes related to on-channel and off-channel operation is illustrated in FIG. 12.

Scheduling

Because the sub-mesh is on-channel/off-channel in a known and predictable way, this can be used to schedule communications with and within the sub-mesh.

In other words, the nodes know how long they have before the next batch of data needs to be sent to the link node. Therefore, nodes in the group can negotiate and schedule their transmissions based on this known reference time (start and period). This negotiation may be based on proximity to the link node (e.g. furthest node away sends first), the amount of data to send (e.g. nodes with higher data harvest rate get higher priority), a priority level set by the CC (e.g. high resolution data required from some nodes vs. low resolution data required from others), or some other mechanism.

The simplest technique for scheduled node data harvesting is if the link node polls each node for data. The data may be harvested one node at a time or the link node may poll two or more nodes for simultaneous download to the link node.

Sub-Mesh Power Saving Mode

While the link node transfers the bulk of the data to the L1 aggregator, other nodes in the sub-mesh can take advantage of the periodicity of the on-channel collection time to save power. This is simplified through the use of the "link node transfer complete" and "L1 transfer complete" messages sent by the link node. The mechanism works as follows:

During the off-channel state, the sub-mesh nodes transfer their data for the current time slice up to the link node. When a node completes its transfer, it may send a "link node transfer complete" message to the link node, indicating that it has no more data to transfer during this time slice. This does not mean the node can enter a power saving mode, because it may need to relay data for another node. When the link node receives indication from all sub-mesh nodes that their link node transfers have completed, it may send an indication to the nodes, allowing them to enter power save mode with the knowledge that they will not be required to relay data.

This indication may not need to be implicitly signaled if the transfer size for each node is known to the link node in advance. In this case, there is a risk that a node needs to transfer additional data (such as a control message or indication for the CC), and if the link node mistakenly allows all nodes to enter power save mode, that message will be delayed until the next time slice. If this is unacceptable, an alternative to explicit signaling is to allow a time gap after all anticipated data is transferred before indicating that power save modes may be entered.

The sub-mesh nodes can remain in power-save mode for the remainder of the off-channel period as well as the entire on-channel period (if desired) because the transfer to the L1 aggregator is between the link node and the L1. Once the link node/L1 transfer period is complete, the L1 may indicate this to the sub-mesh nodes. For maximum power savings, the sub-mesh nodes can remain in power-save mode until the sub-mesh re-enters the off-channel state.

When this time comes, the nodes may begin (on a scheduled or random bases) uploading data for the next on-channel time slice. The nodes can use internal timers or an explicit message from the L1 to determine when the sub-mesh has entered off-channel state, and at that point they may begin transfer of the next data set to the link node.

Throttling

There are at least two conditions which may result in an overflow and subsequent throttling:

The L1 switches to another channel before the link node can complete the current transmission. In this case, the link node may find that the transmission has timed out, or it has had an indication from the L1 that a new on-channel period has begun before it has completed transmission of the previous on-channel data transmission.

When switching on-channel, the L1 may send a short message to the link node indicating the time duration and/or amount of data to be transferred during the current on-channel time slice. The link node calculates that the number is less than the amount of time/data required to upload the current on-channel data.

When a link node determines that the on-channel time is insufficient to allow it to upload all data for a given on-channel time slice, it should indicate this condition (overflow) to the L1 at the next on-channel time slice, and it may also indicate the condition to the nodes in the sub-mesh, allowing them to help by reducing the amount of data to be uploaded. This allows the system to continue operating in a reduced resolution mode until the operator (alerted by a message from the L1) can rectify the problem. The link node or the L1 (or both) may also notify the CC of this condition. When receiving notice overflow, the CC may re-arrange the mesh assignments to provide adequate connection to the links in the sub-mesh.

Deploying L1s with Multiple Node Mesh Radios

While the focus of this disclosure is on the L1 aggregator with two radios (one for the node sub-mesh, one for the L1 mesh), these techniques can be applied to a multi-radio aggregator (e.g. 3 node mesh radios, 1 L1 radio). Instead of a single radio switching channels, these techniques allow the L1 to schedule down time for multiple radios (also allowing the pipelining mechanisms described in this disclosure for the node sub-meshes), saving power at the L1 and in the sub-meshes.

A 2-Channel Example

In the following 2-channel example, the L1 aggregator is switching between two sub-meshes, mesh-1 and mesh-2. See FIG. 13 for an illustration of the process. We join the process as mesh 1 goes on-channel and mesh-2 goes off-channel. Here we see that the (top, mesh 1) link node initiates a data download to the L1 while the other mesh nodes continue in their power-save mode. Following the completion of the download, the mesh nodes may awaken and send arbitrary data, messages, indications through the link node and L1 out to the network. When all transmissions are complete, all nodes (including the link node) can enter a power saving mode. The L1 may stay on this channel, move to another channel or sleep until the mesh-2 on-channel period starts. In the figure, the L1 remains on-channel.

As the L1 moves off-channel for mesh-1 and on-channel for mesh-2, the mesh-1 nodes begin transferring the next slice of data to the link node. In the figure, we see this as "rx N" for the link node and "tx LN" for the other nodes in the sub-mesh.

When this process is complete, a quiet period may be scheduled to allow ad hoc transmissions to occur within the mesh before all nodes enter a power saving mode, and then the process repeats itself.

Using some example data, the following values may shed light on a typical scenario. Assume for simplicity that we have a perfectly linear mesh, node-to-node throughput is 11.2 Mbps, and each node is harvesting data at a rate of 32 bits every ms. In a typical linear mesh, we find that end-to-end throughput for a given node depends on the number of hops between that node and the final destination for the data. For a 6-node linear mesh illustrated in FIG. 14, typical throughput values are shown in the figure.

Figure 14:
FIG. 14 shows a typical scenario of linear mesh, node-to-node throughput data speeds.

Note that in FIG. 14, "F" is the link node and "X" is the L1 Aggregator. In other configurations, a middle node such as "D" may be the link node, or there may be multiple link nodes, such as "C" and "D" sharing the responsibilities of the link node.

Figure 13:
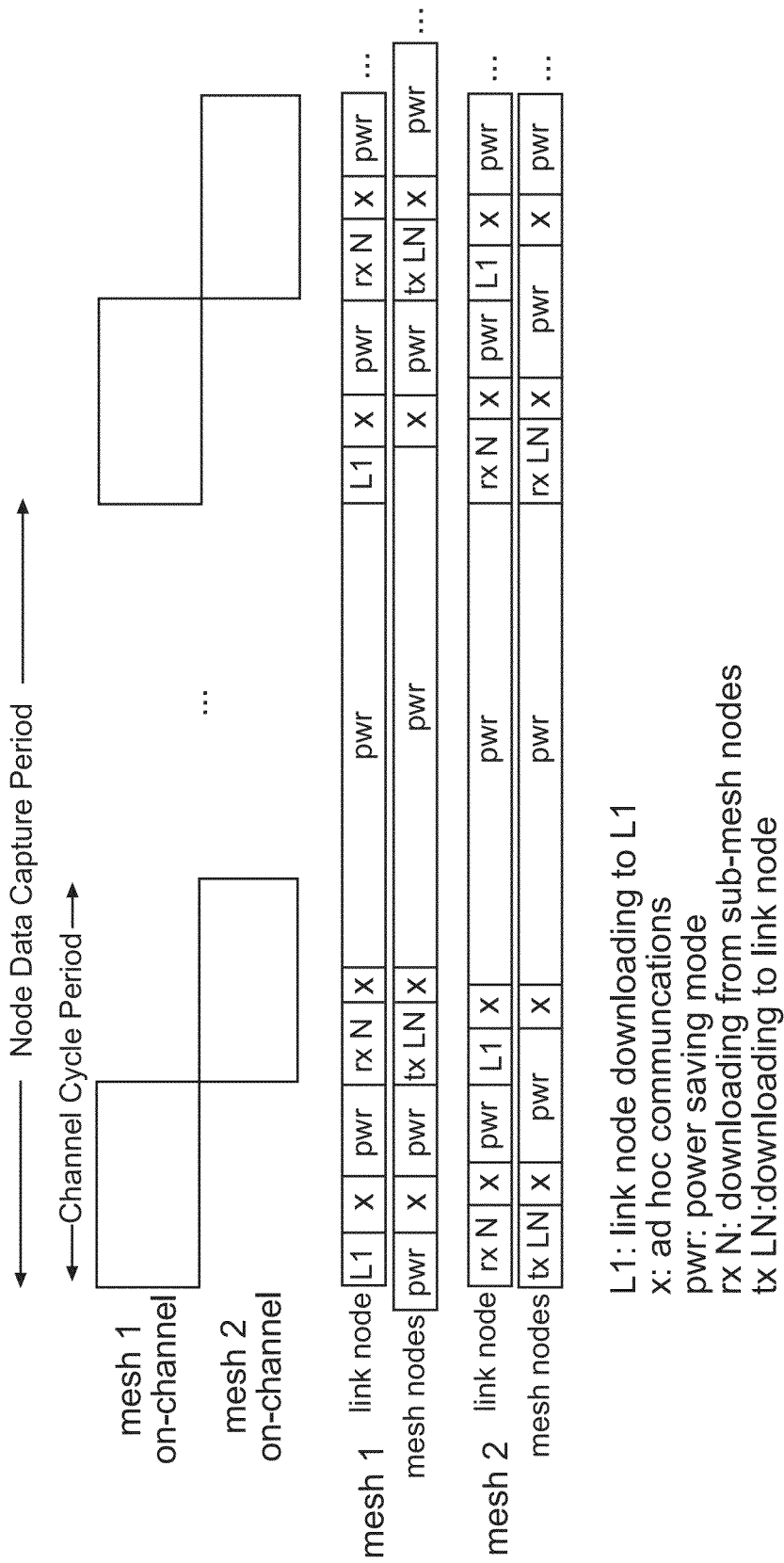
FIG. 13 shows a diagram of the process of the L1 aggregator switching between two sub-meshes.

In this example each node packages 200 ms worth of data (6400 bits) for transport to the CC. The first step of the download is to move the data to the link node. In the case of node A, the end-to-end data rate is 2.2 Mbps, so the transfer takes approximately 2.9 ms. Here, we do not include the probability of re-transmissions, but that time is accounted for later. For the sake of simplicity, we assume each node takes a turn transmitting their data, but it's possible to poll nodes to send at the same time or allow the nodes to transmit freely and let the network sort it out. Working toward node F, node B transmits next, 6400 bits at 2.5 Mbps means it takes approximately 2.6 ms for the transfer the data to the link node. Continuing down the line, the total mesh-to-link-node transfer time is: 2.9+2.6+2.1+1.4+0.6 ms=9.6 ms. This time is shown in FIG. 13 as the txLN/rxN period, and we set the "ad hoc communications" period to 10.4 ms to make this a round value of 20 ms to move data to the link node. This period is adjustable and may be much longer if required. If the link node signals the end of the ad hoc period, it becomes completely flexible and allows for more power saving time.

When the data transfer and ad hoc communications period ends, nodes are notified so that they may enter power saving mode. All nodes except the link node remain in power saving mode until the link node completes transfer of the data up to the L1 during the next on-channel period. At this point, the sub-mesh nodes may awaken to handle new data sent from the L1, or the link node may hold that data until the nodes begin transfer during the next off-channel period.

Timing is tracked at each node so that the node wakes up just prior to the next period where it may need to send data or relay data for other nodes. The timing and duty cycle is typically set by the L1 and/or link node.

Messages

Some example messages mentioned above are defined here. This messaging is focused on the link node/L1 connection to communicate resource use, data transfer issues, and to control data flow.

Upload Size

This message is used by the link node to indicate to the L1 the approximate upload data size and/or time. The L1 can use this to schedule the next channel hop. For example, if there is more data than the current time slice allows, it may indicate this to the link node so that the link node can reduce the transmission and enable complete transmission of some packets before losing the channel. The link node may also use this information to throttle local nodes prior to the next transmission time slice.

Overflow

Sent from the link node to the L1 to indicate that during the last transmission period, the L1 moved off-channel before the link node was able to upload all sub-mesh data for that period.

L1 Transfer Complete

This message sent from the link node to the L1 indicates that all transmissions from this cluster for this time slice are complete, allowing the L1 to move to another channel and possibly also allowing the L1 to alter scheduling in favour of other clusters that have recently indicated overflow.

The same message may be sent to the nodes in the sub-mesh, indicating the link node is ready to receive new data for the next on-channel time slice.

Polling Messages

Allow the link node or the L1 to pull data from specific nodes during the link time.

Link Node Transfer Complete

All nodes have indicated that upload of their collection data for the current time slice is complete. This allows nodes to sleep (knowing they do not have any relay data to pass).

Link Node Designate

This message is used by the L1 to designate a sub-mesh node as the link node. This message may be sent to the designated link node or to the entire sub-mesh. If the sub-mesh designates the link node, a message must be sent to the L1 so that when it returns to on-channel state for this mesh, it knows which node to use as link node.

A sub-mesh may have more than one link node, multiple link nodes may be active at the same time, and the designated link node may change.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property of privilege is claimed are defined as follows:

1. A method of collecting data from wireless sensor units arranged in a mesh network, each wireless sensor unit having one or more sensors arranged on or below the ground surface for remote seismic recording, the method comprising:
   clustering the wireless sensor units into two or more sub mesh clusters, each sub mesh cluster having an aggregator assigned to the sub mesh cluster;
   acquiring data with the wireless sensor units by sensing one or more physical parameters;
   within each sub mesh cluster, each of the wireless sensor units transmitting the acquired data directly or indirectly to the respective aggregator;
   each aggregator processing the acquired data to produce processed acquired data of reduced transmission bandwidth requirements than the acquired data, the processing comprising determining a representative data set to transmit to the base node as aggregated data and producing from the acquired data from each wireless sensor unit respective data sets of offset values relative to the representative data set to transmit to the base node as part of the aggregated; and
   each aggregator transmitting the aggregated data to a base node by real-time streaming in packets.

2. The method of claim 1 in which clustering further comprises:
   the base node transmitting a discovery command to each aggregator;

each aggregator acquiring by local discovery a list of wireless sensor units within a predetermined range from each aggregator;

each aggregator transmitting the list to the base node;

the base node clustering the wireless sensors into the two or more sub mesh clusters and assigning a respective aggregator to each sub mesh cluster based on the acquired lists; and the base node transmitting to each aggregator an assignment of the wireless sensor units contained in the sub mesh cluster assigned to the aggregator.

3. The method of claim 2 in which the predetermined range is one or more of a maximum number of hops, a maximum cluster size, a maximum distance from each aggregator, or minimum node signal quality.

4. The method of claim 1 in which clustering further comprises:

the base node transmitting a discovery command to each aggregator;

each aggregator acquiring by discovery a list of wireless sensor units within a predetermined range from each aggregator; and each aggregator determining a respective sub mesh cluster for the aggregator.

5. The method of claim 1 further comprising for each sub mesh cluster, positioning the respective assigned aggregator within the sub mesh cluster.

6. The method of claim 5 in which the position of each aggregator is selected to one or more of minimize the combined number of hops from the wireless sensor units in the respective sub mesh cluster, maximize the signal quality of the wireless sensor units in the respective sub mesh cluster to the aggregator, or maximize the signal quality of the aggregator to the base node.

7. The method of claim 1 in which the wireless sensor units transmit the acquired data to the respective aggregator in response to an aggregator transmit command from the respective aggregator.

8. The method of claim 1 in which some or all of the aggregated data is transmitted by an aggregator in response to one or more transmit commands transmitted from the base node.

9. The method of claim 8 in which the one or more transmit commands contain a schedule of one or more unique transmit time slots for each aggregator to transmit the respective aggregated data without interfering in the transmissions of other aggregators.

10. The method of claim 9 in which each unique transmit time slot is selected based on one or more of the size of the respective sub mesh cluster, or throughput requirements of the respective aggregator.

11. The method of claim 1 in which the representative data set further comprises one or more of the acquired data from one or more wireless sensor units within the respective sub mesh cluster, an average data set of the acquired data of the wireless sensor units within the respective sub mesh cluster, and a median data set of the acquired data of the wireless sensor units within the respective sub mesh cluster.

12. The method of claim 1 further comprising:

each aggregator comparing the acquired data between wireless sensor units; and each aggregator alerting the base node if the acquired data from one or more of wireless sensor units differs by more than a predetermined range from the acquired data sets of other wireless sensor units.

13. The method of claim 1 further comprising:

each aggregator status polling the wireless sensor units within the respective sub mesh cluster and generating a status report; and each aggregator transmitting the status report to the base node.

14. The method of claim 1 further comprising:

the base node transmitting a channel change command to an aggregator; and the aggregator transmitting a signal to each of the wireless sensor units within the respective sub mesh cluster to change channels.

15. The method of claim 1 in which each of the wireless sensor units transmitting the acquired data further comprises:

transmitting the acquired data without timestamps; and adding one or more timestamps to the acquired data at the aggregator level or base node level.

16. A method of collecting data from wireless sensor units arranged in a mesh network, each wireless sensor unit having one or more sensors arranged on or below the ground surface for remote seismic recording, the method comprising:

clustering the wireless sensor units into two or more sub mesh clusters, each sub mesh cluster having an aggregator assigned to the sub mesh cluster;

acquiring data with the wireless sensor units by sensing one or more physical parameters;

within each sub mesh cluster, each of the wireless sensor units transmitting the acquired data directly or indirectly to the respective aggregator;

each aggregator aggregating at least a portion of the acquired data received from the wireless sensor units within the respective sub mesh cluster into aggregated data; and each aggregator transmitting the aggregated data to a base node;

in which each of the wireless sensor units transmitting the acquired data further comprises:

transmitting the acquired data without timestamps; and adding one or more timestamps to the acquired data at the aggregator level or base node level;

in which the acquired data is transmitted with one or more time offsets relative to a reference timestamp to allow calculation of the one or more timestamps at the aggregator level or base level.

17. A method of collecting data from wireless sensor units arranged in a mesh network, each wireless sensor unit having one or more sensors arranged on or below the ground surface for remote seismic recording, the method comprising:

clustering the wireless sensor units into two or more sub mesh clusters, each sub mesh cluster having an aggregator assigned to the sub mesh cluster;

acquiring data with the wireless sensor units by sensing one or more physical parameters;

within each sub mesh cluster, each of the wireless sensor units transmitting the acquired data directly or indirectly to the respective aggregator;

each aggregator aggregating at least a portion of the acquire data received from the wireless sensor units within the respective sub mesh cluster into aggregated data; and each aggregator transmitting the aggregated data to a base node;

in which each of the wireless sensor units transmitting the acquired data further comprises:

transmitting the acquired data without timestamps; and adding one or more timestamps to the acquired data at the aggregator level or base node level;

in which the acquired data is transmitted at one or more scheduled times to allow calculation of the one or more timestamps at the aggregator level or base level.

* * * * *